United States Patent
Shoji et al.

[11] Patent Number: 6,122,358
[45] Date of Patent: *Sep. 19, 2000

[54] OPERATOR CONNECTION CONTROL METHOD

[75] Inventors: Shuichi Shoji; Eriko Kawaguchi; Hajime Ogasawara, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/811,470

[22] Filed: Mar. 4, 1997

[30] Foreign Application Priority Data

Sep. 11, 1996 [JP] Japan ................ 8-240213

[51] Int. Cl.$^7$ ................ H04M 3/42
[52] U.S. Cl. ................ 379/209; 379/265; 379/266; 379/219; 379/207
[58] Field of Search ................ 379/309, 265, 379/266, 214, 165, 201, 210, 211, 246, 209, 219, 220, 221, 260, 261, 262

[56] References Cited

U.S. PATENT DOCUMENTS

| | | | |
|---|---|---|---|
| 4,953,204 | 8/1990 | Cuschleg, Jr. et al. | 379/374 |
| 5,185,782 | 2/1993 | Srinivasan | 379/265 |
| 5,291,551 | 3/1994 | Conn et al. | 379/265 |
| 5,311,574 | 5/1994 | Livanos | 379/209 |
| 5,329,578 | 7/1994 | Brennan et al. | 379/142 |
| 5,459,780 | 10/1995 | Sand | 379/265 |
| 5,511,112 | 4/1996 | Szlam | 379/265 |
| 5,537,470 | 7/1996 | Lee | 379/266 |
| 5,590,188 | 12/1996 | Crockett | 379/265 |
| 5,625,682 | 4/1997 | Gray et al. | 379/266 |
| 5,633,924 | 5/1997 | Kaish et al. | 379/265 |
| 5,692,033 | 11/1997 | Farris | 379/265 |
| 5,768,360 | 6/1998 | Reynolds et al. | 379/265 |
| 5,778,060 | 7/1998 | Otto | 379/265 |

FOREIGN PATENT DOCUMENTS

| | | |
|---|---|---|
| 53-114306 | 10/1978 | Japan. |
| 55-58654 | 5/1980 | Japan. |
| 58-14646 | 1/1983 | Japan. |
| 58-30261 | 2/1983 | Japan. |
| 58-66455 | 4/1983 | Japan. |
| 58-99054 | 6/1983 | Japan. |
| 59-178853 | 10/1984 | Japan. |
| 62-132461 | 6/1987 | Japan. |
| 1-317063 | 12/1989 | Japan. |
| 3-38194 | 2/1991 | Japan. |
| 3-139954 | 6/1991 | Japan. |

*Primary Examiner*—Harry S. Hong
*Assistant Examiner*—Benny Q. Tieu
*Attorney, Agent, or Firm*—Helfgott & Karas, PC.

[57] ABSTRACT

A terminal management unit for executing control for connection to an operator when a communication apparatus is busy is provided in a network, and terminals connected to the network are registered as operator terminals in a master list possessed by the terminal management unit If the communication apparatus is busy when an incoming call from a caller arrives at the communication apparatus, the terminal management unit stores the telephone number of the caller in a registration list on the originating side. The terminal management unit subsequently refers to the master list, periodically calls the operator terminals and, when an operator terminal responds, calls the caller, which has been registered in the registration list on the originating side, and connects the caller to this operator terminal.

35 Claims, 30 Drawing Sheets

ORDINARY NETWORK

INTELLIGENT NETWORK

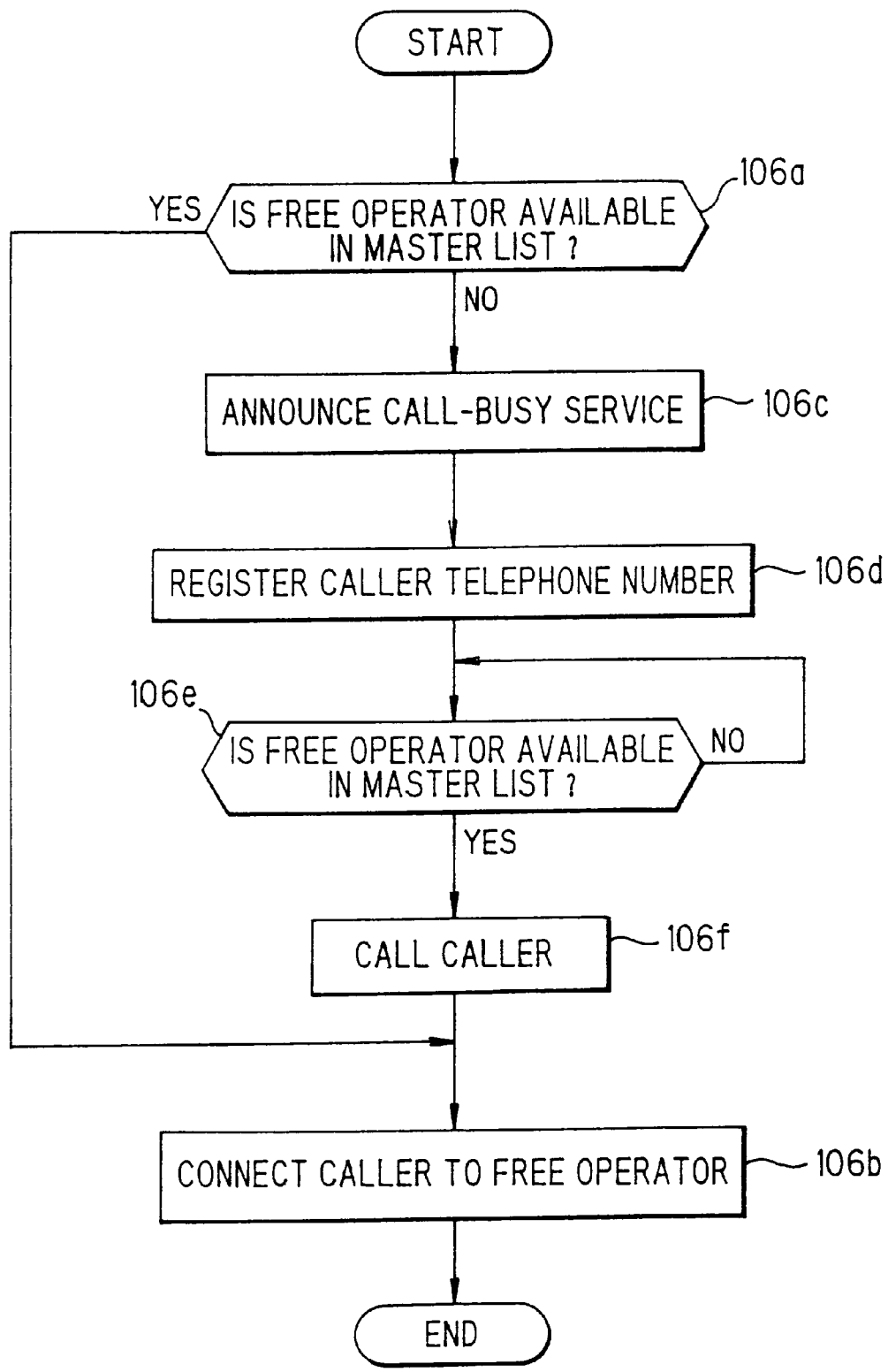

FIG. 6A

MASTER LIST (OPERATOR LIST)

| OPERATOR | TEL. NO. |
|---|---|
| A | × × × · · · × |
| B | △ △ △ · · · △ |
| C | ○ ○ ○ · · · ○ |
| D | □ □ □ · · · □ |
| E | ▽ ▽ ▽ · · · ▽ |

— MLS

FIG. 6B

ACTIVE LIST

| ACTIVE OPERATOR | TEL. NO. |
|---|---|
| A | × × × · · · × |
| B | △ △ △ · · · △ |
| C | ○ ○ ○ · · · ○ |
|  |  |

— ALS

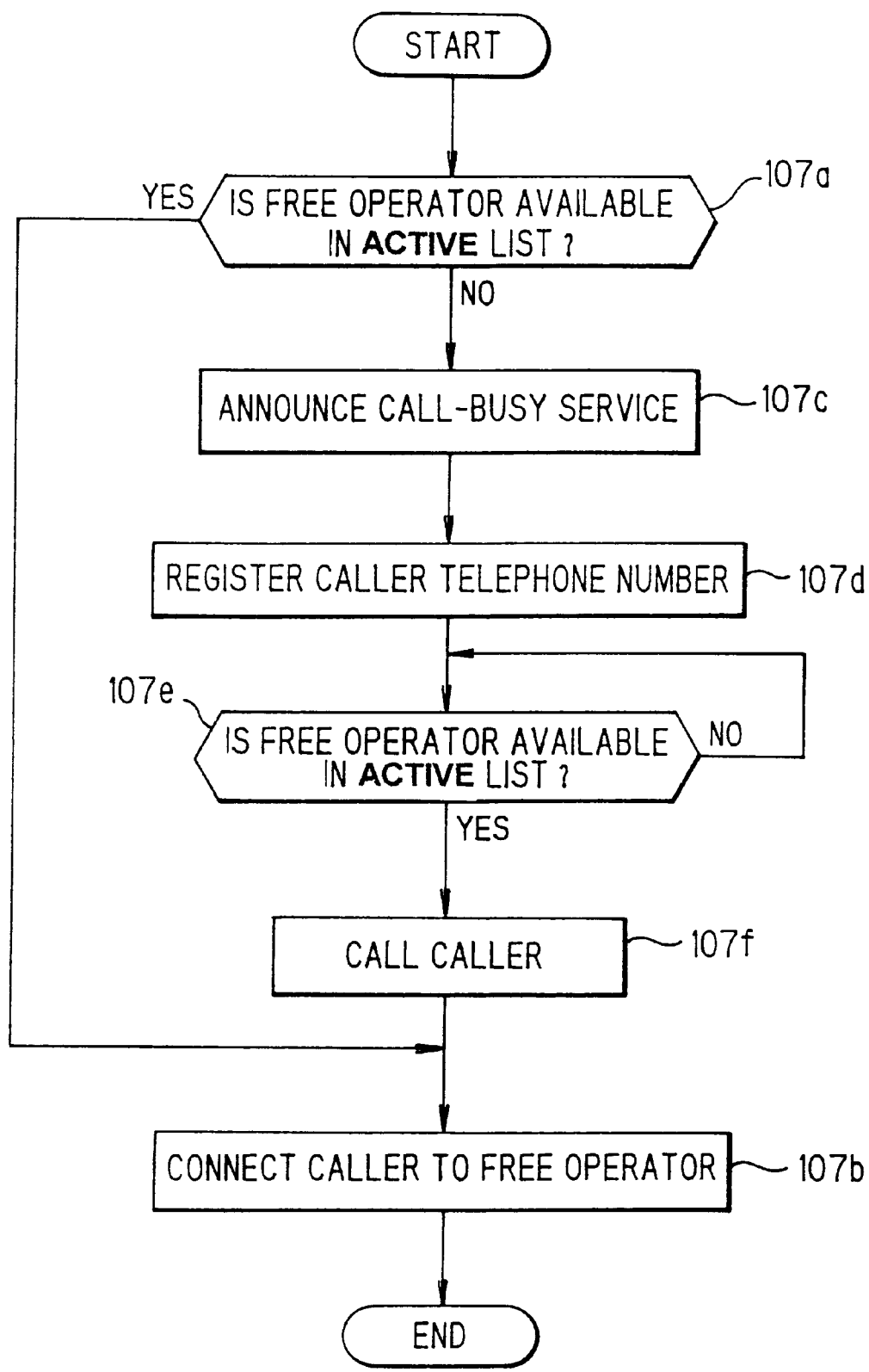

| ACTIVE OPERATORS | TEL. NO. | NUMBER NR OF NON-RESPONSES |
|---|---|---|
| A | ×××···× | NRa |
| B | △△△···△ | NRb |
| C | ○○○···○ | NRc |
| ··· | ··· | ··· |

FIG. 18

MASTER LIST (OPERATOR LIST)

| OPERATOR | TELEPHONE NUMBER | ACTIVE DAY (DAY OF THE WEEK) | ACTIVE PERIOD | ACTIVE TIME PERIOD | LANGUAGE USED |
|---|---|---|---|---|---|
| A | ×××····× | SATURDAY, SUNDAY | 9:00~17:00 | | ENGLISH, SPANISH |
| B | ▽▽▽····▽ | MONDAY, TUESDAY | 17:00~24:00 | | ENGLISH, JAPANESE |
| C | ○○○····○ | ⋮ | ⋮ | | SPANISH |
| D | □□□····□ | ⋮ | ⋮ | | JAPANESE |
| | | | | | |

ALS

| OPERATOR | TEL | ACTIVE DAY | ACTIVE TIME PERIOD | | TIME DIFFERENCE |
|---|---|---|---|---|---|
| A | ××···× | ··· | 9:00~17:00 | ··· | 0 |
| B | △△···△ | ··· | 9:00~17:00 | ··· | +8 |
| C | ○○···○ | ··· | 9:00~17:00 | | −2 |
| | | | | | |

ALS'

| OPERATOR | TEL | ACTIVE DAY | ACTIVE TIME PERIOD | | CONNECTABLE TIME |
|---|---|---|---|---|---|
| A | ××···× | ··· | 9:00~17:00 | ··· | 9:00~17:00 |
| B | △△···△ | ··· | 9:00~17:00 | ··· | 17:00~1:00 |
| C | ○○···○ | ··· | 9:00~17:00 | | 7:00~15:00 |
| | | | | | |

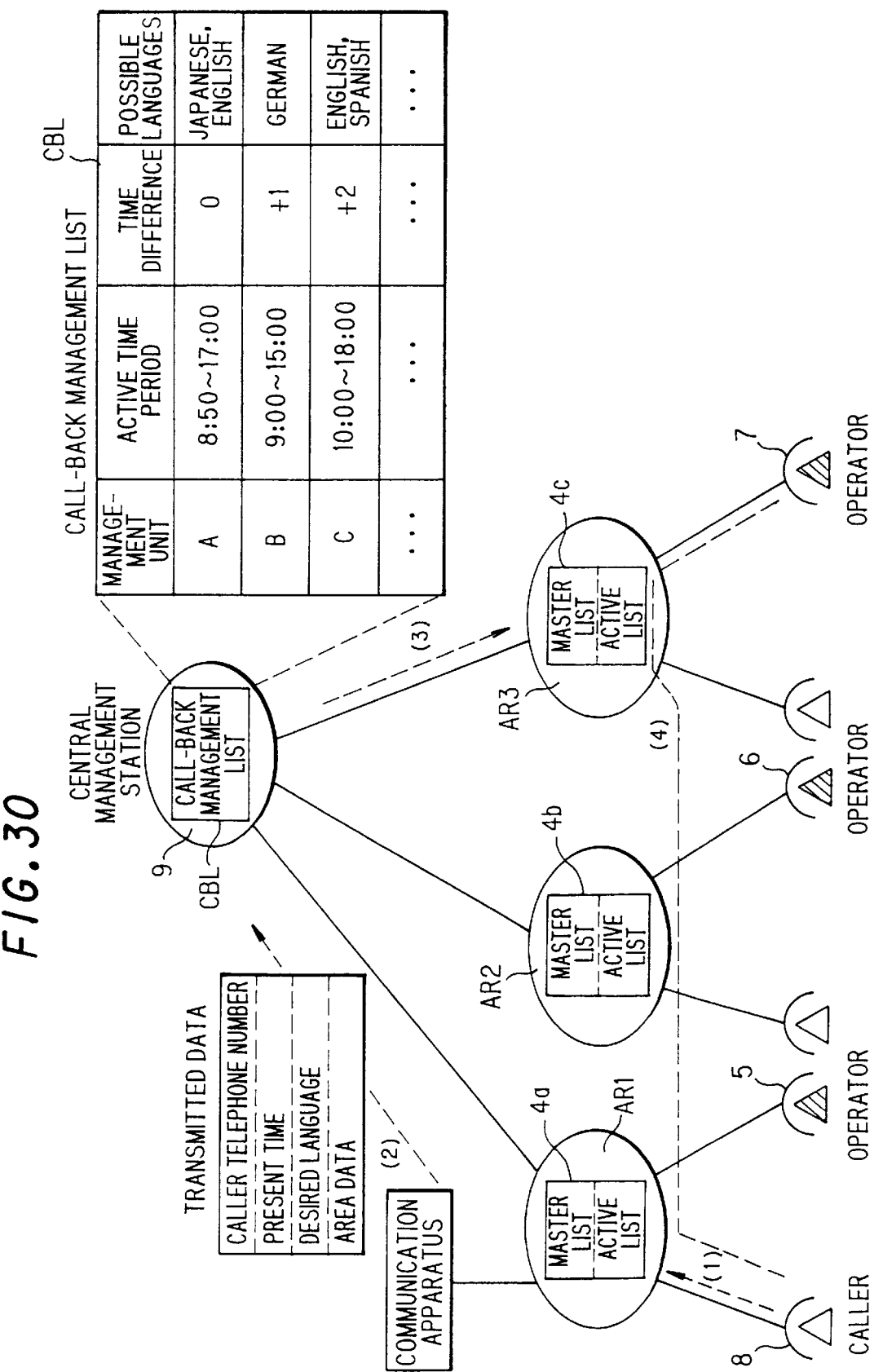

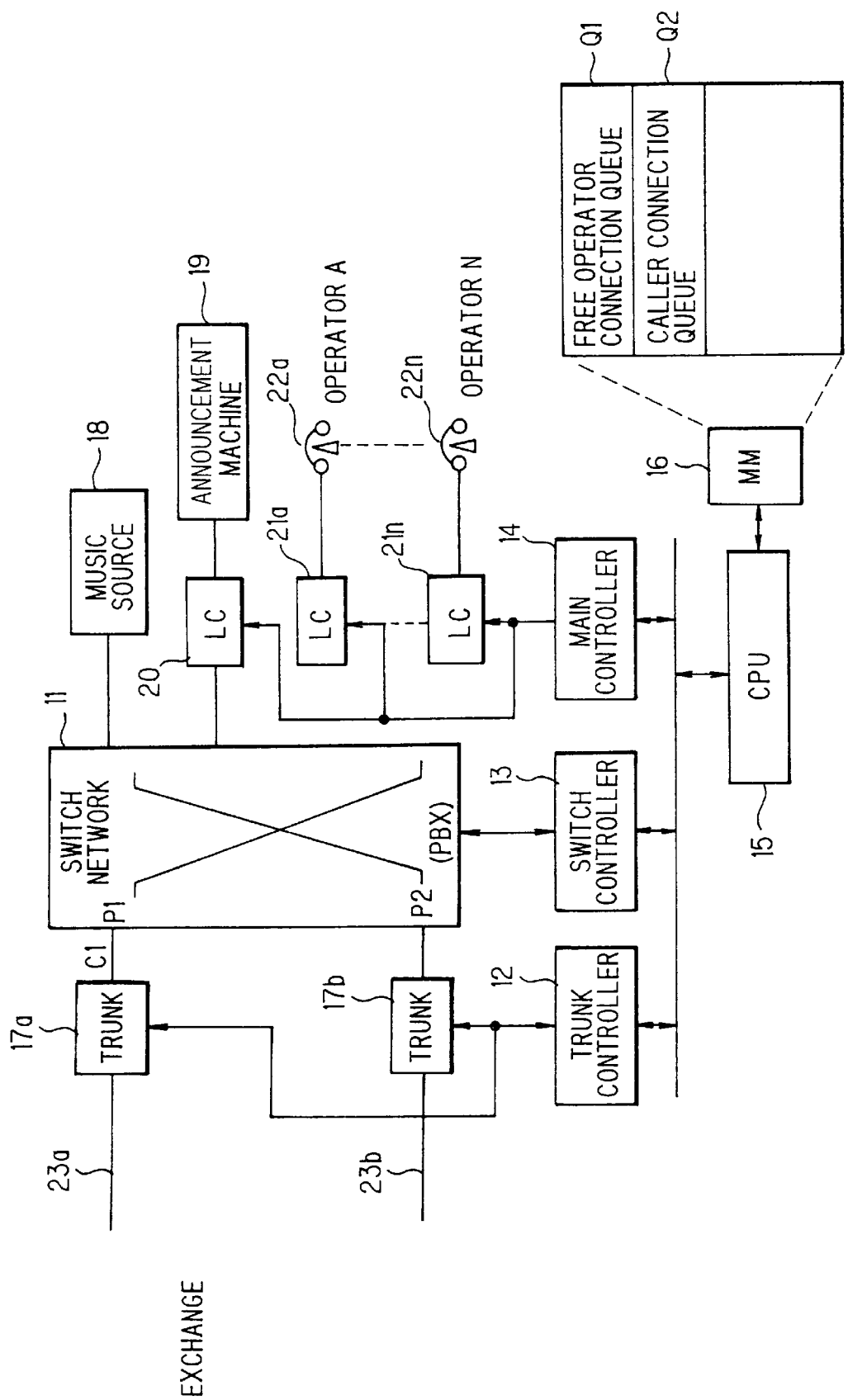

OPERATOR CONNECTION CONTROL METHOD

BACKGROUND OF THE INVENTION

This invention relates to a method of controlling connection to an operator when incoming calls arrive at busy operator terminals. More particularly, the invention relates to an operator connection control method for when a communication apparatus is found to be busy, wherein a caller is connected to an operator when the call is terminated and the operator is allowed to provide the caller with a predetermined answer.

In a system (communication system) in which there are a large number of incoming calls, such as a ticket reservation/sales system that makes tickets available for a variety of events, a television shopping system and an airline/train reservation system, incoming calls are connected to a plurality of extensions (operator terminals) so that the callers may be answered. In a case where all operator terminals are busy when there is an incoming call from a caller, the caller is placed in a queue until an operator terminal becomes available. In the meantime, an announcement or music is played for the waiting caller to hear. When an operator terminal becomes available, callers are connected to the available operator terminal in the order in which in which they were queued.

FIG. 31 is a block diagram of such a communication system, which includes a switch network 11, a truck controller 12, a switch controller 13, a line controller 14, a central processing unit (CPU) 15, a main memory device 16, trunks (TRK) 17a, 17b, a music source 18, an announcement machine 19, line circuits (LC) 20, 21a~21n and operator terminals 22a~22n. The trunks 17a, 17b are provided between an exchange (not shown) and the switch network 11. The connection to the exchange is by way of trunk lines (main wires) 23a, 23b. Though a large number of trunk lines are connected to the trunks 17a, 17b, only one trunk line (23a, 23b) is shown to be connected to each trunk in FIG. 31 in order to simplify the illustration. The trunks 17a, 17b are arranged to correspond to pilot extensions P1, P2, respectively, and are controlled by the trunk controller 12.

The music source 18, which allows a caller to hear a predetermined melody, is connected to a switch network 11. The announcement machine 19, which allows a caller to hear an appropriate announcement, is connected to the switch network 11 via the line circuit 20. The operator terminals (extensions 22a~22n) are connected to the switch network 11 via the line circuits 21a~21n, respectively. The line controller 14 controls the line circuits 20, 21a~21n. The CPU 15 controls the line controller 12, switch controller 13 and line controller 14 and accesses the main memory device 16 to write and read data. The switch controller 13 exercises control to connect or disconnect the trunks 17a, 17b to or from the line circuits 20, 21a~21n and music source 19. The main memory device 16 stores a connection queue Q1 of free operator terminals and a connection queue Q2 of callers.

When a call C1 arrives at, say, the pilot extension P1, the CPU 15 causes a predetermined announcement to be played and then connects the music source 18 to the incoming call to send a melody to the caller. The CPU 15 then searches the connection queue Q1 and determines whether there is a free operator terminal. If there is a free operator available, the CPU 15 instructs the switch controller 13 to terminate the incoming call C1 at the free operator, removes the operator terminal that has terminated the call from the connection queue Q1 and ends control for connecting the incoming call C1 to the operator terminal. On the other hand, if there is no free operator terminal available and one does not become available upon elapse of a predetermined period of time, the CPU 15 queues the incoming call C1 in the connection queue Q2 and then waits for a free operator terminal to appear. When a free operator terminal appears, the CPU 15 connects the incoming call waiting at the top of the connection queue Q2 to the above-mentioned free operator terminal and removes this incoming call from the connection queue Q2. Further, the CPU 15 removes the operator terminal to which the incoming call has been connected from the connection queue Q1. The CPU 15 thenceforth repeats control similar to that described above.

In this service for dealing with incoming calls that arrive at busy terminals, the caller does not know when he or she will be connected and, as a consequence, may discontinue the call while waiting for the connection. In such case the caller must call again later. Repeating the same operation until the connection is established is very troublesome.

Further, operators are managed in centralized fashion and the period of time during which calls can be accepted is limited. This causes calls to be placed in concentrated fashion and lengthens the amount of time one must wait to be connected. There are many cases in which a connection cannot be achieved even after calling repeatedly.

SUMMARY OF THE INVENTION

Accordingly, an object of the present invention is to arrange it so that when a communication apparatus is busy with respect to incoming calls, a caller can be called back and connected to an operator terminal by control on the network side if the caller discontinues the call.

Another object of the present invention is to arrange it so that a terminal, e.g. a terminal in one's home, that has been connected to a network externally of a communication apparatus can be registered and utilized as an operator terminal.

A further object of the present invention is to utilize a terminal that is external to a communication apparatus as an operator terminal, thereby making it possible to lengthen call reception time and increase the number of operator terminals and, as a consequence, to reduce situations in which calls become concentrated or cannot be readily connected.

Still another object of the present invention is to perform operator connection control so as to shorten operator connection time by providing a master list for registering all operator terminals and an active list for registering only operator terminals that are capable of responding, wherein an operator sequentially registers/deletes operator terminals capable of responding in/from the active list so that only operator terminals that have been registered in the active list are dealt with in the control operation.

Yet another object of the present invention is to perform operator connection control by registering dates on which a response is possible and lengths of time during which a response is possible in correspondence with operator terminals, whereby only operator terminals capable of responding at the current date and time are dealt with in the control operation.

A further object of the present invention is to arrange it so that an operator terminal capable of responding in a language desired by the caller can be connected to the caller by registering the languages used by operators so as to correspond to the operator terminals.

A further object of the present invention is to arrange is so that a subscriber can be connected to an operator terminal by taking into account the time periods during which registered operator terminals are active, as well as the local time difference, in a case where the operator terminals are located in areas for which there is a time difference relative to the location of the caller.

Another object of the present invention is to arrange it so that a caller can be notified of the average time that will be needed to make a connection to an operator terminal.

In accordance with the present invention, the foregoing objects are attained by providing an operator connection control method for control when a communication apparatus is busy, the method connecting a caller to an operator at the time of an incoming call and allowing the operator to make a prescribed response to the caller, comprising the steps of internally providing a network with a terminal management unit for executing operator connection control when the communication apparatus is busy, pre-registering in the terminal management unit an operator terminal used by an operator, this terminal being connected to the network externally of the communication apparatus, storing, by the terminal management unit, a telephone number of a caller in a case where the communication apparatus is busy when there is an incoming call to the communication apparatus, and subsequently having the terminal management unit call operator terminals periodically and, when an operator terminal responds, call the caller and connect the caller to this operator terminal.

In accordance with the present invention, the foregoing objects are attained by providing an operator connection control method wherein the terminal management unit has a master list for registering the operator terminals and an active list for registering operator terminals which, from among the operator terminals that have been registered in the master list, are capable of actually responding to the caller, the terminal management unit periodically calling the operator terminals that have been registered in the active list and, when an operator terminal responds, calling the caller and connecting the caller to this operator terminal.

In accordance with the present invention, the foregoing objects are attained by providing an operator connection control method further comprising the steps of simultaneously registering dates and times at which operators are active when terminals are registered in the master list as operator terminals, periodically calling active operator terminals for which the current date and time are included as the active day and time and, when an operator terminal responds, calling the caller and connecting the caller to this operator terminal.

In accordance with the present invention, the foregoing objects are attained by providing an operator connection control method further comprising the steps of registering languages, which are used by operators of the operator terminals, in the master list at the same time that terminals are registered in the master list as the operator terminals, and obtaining operator terminals, whose languages are desired by a caller, from the active list, periodically calling these operator terminals and, when an operator terminal responds, calling the caller and connecting the caller to this operator terminal.

In accordance with the present invention, the foregoing objects are attained by providing an operator connection control method, wherein when operator terminals are connected to the network in dispersed fashion in areas for which there is a time difference relative to an area in which the terminal management unit is located, the time differences between the area in which the terminal management unit is located and the areas in which the operator terminals are located are registered in the terminal management unit, the terminal management unit obtaining operator terminals, which are in an active time period, from among the operator terminals that have been registered in the active list, upon taking time difference into account, periodically calling these operator terminals and, when an operator terminal responds, calling the caller and connecting the caller to this operator terminal.

Other features and advantages of the present invention will be apparent from the following description taken in conjunction with the accompanying drawings.

BRIEF DESCRIPTION OF THE DRAWINGS

FIG. 5 is a second processing flowchart of a call-busy service;

FIGS. 6A, 6B are diagrams for describing two-aspect management of operator terminals;

FIG. 7 is a processing flowchart of a call-busy service;

FIG. 18 illustrates another example of a master list;

FIG. 30 is a diagram showing the configuration of a system in a case where terminal management units are decentralized; and FIG. 31 is a diagram showing the configuration of a conventional communication apparatus.

DESCRIPTION OF THE PREFERRED EMBODIMENTS

Figure 1:
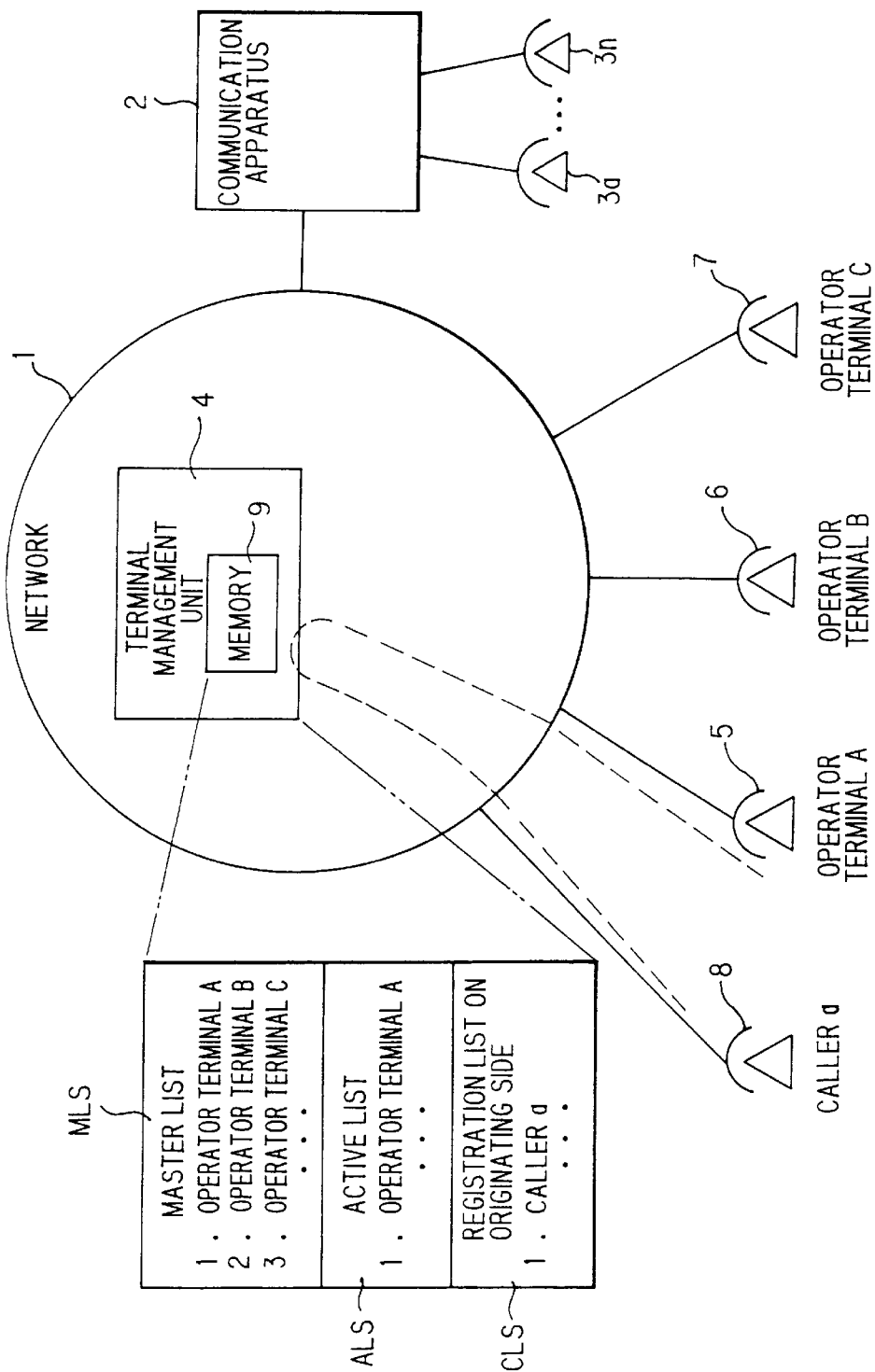
FIG. 1 is a diagram showing an overview of the present invention.

FIG. 1 is a diagram for describing the principles of the present invention.

Shown in FIG. 1 are a network 1, a communication apparatus 2 which, at the time of incoming calls, connects the callers to operators 3a~3n (which belong to the communication apparatus 2) and allows the operators 3a~3n to make prescribed responses to the callers, a terminal management unit 4 for executing operator connection control, and operator terminals 5~7 connected to the network 1 externally of the communication apparatus 2. Numeral 8 denotes a caller (calling terminal). The terminal management unit 4 has a memory 9 storing a master list NLS, an active list ALS and a calling-side registration list CLS.

The network is internally provided with the terminal management unit 4, which executes operator connection control when the communication apparatus is busy. Further, the terminal management unit 4 pre-registers the terminals 5~7, which are connected to the network 1 externally of the communication apparatus 2, in the master list MLS of the terminal management unit 4 as operator terminals. If the communication apparatus 2 is busy (i.e., if all of the operators 3a~3n are busy) when a call from the caller 8 arrives at the communication apparatus 2, the terminal management unit 4 stores the telephone number of the caller 8 in the calling-side registration list CLS. The terminal management unit 4 subsequently refers to the master list MLS and calls the operator terminals 5~7 periodically. When a prescribed operator terminal 5 responds, the terminal management unit 4 calls the caller 8, who has been registered in the calling-side registration list CLS, and connects the caller 8 to the operator terminal 5.

If the arrangement described above is adopted, the caller 8 can be called back and connected to any of the operator terminals 5~7 by control on the network side if the caller 8 discontinues the call upon discovering that the communication apparatus 2 is busy. Further, a terminal, e.g. a terminal in one's home, that has been connected to the network externally of the communication apparatus can be registered and utilized as an operator terminal. This makes it possible to lengthen call acceptance time and increase the number of operator terminals, thereby reducing situations in which calls become concentrated or cannot be readily connected.

It can be so arranged that the terminal management unit 4 calculates the average time that will be needed for a caller to be connected to an operator terminal and notifies the caller of the average time calculated. This is convenient for the caller since the caller can ascertain how long it will take to be called back.

The terminal management unit 4 is provided with the master list MLS, which registers the operator terminals 5~7, and with the active list ALS, which stores those of the operator terminals registered in the master list that are active, i.e. capable of actually answering a caller. The terminal management unit 4 periodically calls the operator terminals that have been registered in the active list ALS and, when an operator terminal responds, calls the caller registered in the calling-side registration list CLS and connects the caller to this operator terminal.

If this arrangement is adopted, operator connection control is performed dealing solely with operator terminals that have been registered in the active list. This makes it possible to shorten the time needed to be connected to an operator.

When the terminal management unit 4 registers a terminal in the master list MLS as an operator terminal, a date and time at which the operator will be active are registered in the master list at the same time. The terminal management unit 4 periodically calls the operator terminals that will be active at the current date and time from the active list and, when an operator terminal responds, calls the caller registered in the calling-side registration list CLS and connects the caller to this operator terminal.

If this arrangement is adopted, operator connection control is performed dealing solely with the operator terminals that are truly capable of responding. This makes it possible to shorten the time needed to be connected to an operator.

When the terminal management unit 4 registers a terminal in the master list MLS as an operator terminal, the language used by the operator is registered in the master list at the same time so as to correspond to the operator terminal. The terminal management unit 4 obtains the operator terminal corresponding to the language desired by the caller from the active list ALS, calls this operator terminal periodically and, when the operator terminal responds, connects the caller to this operator terminal.

If this arrangement is adopted, the terminal management unit 4 is capable of creating the active list ALS while classifying the operator terminals according to language based upon the languages used by the operator terminals that have been registered in the master list MLS, and of periodically calling the operator terminals that have been registered in the active list conforming to the language desired by the caller. When an operator terminal responds, the terminal management unit 4 connects the caller to this operator terminal. If this expedient is adopted, operator connection control can be performed in such a manner that an operator terminal using a language desired by the caller can be retrieved in a short period of time.

In a case where an operator terminal that satisfies the condition (language) specified by the caller does not exist in the active list ALS, the terminal management unit 4 goes to the active list ALS to obtain an operator terminal that satisfies a preset (default) condition (e.g., that the language used be English), calls this operator terminal periodically and, when the operator terminal responds, connects the caller to this operator terminal. This expedient makes it possible to connect the caller to an operator terminal reliably even if an operator terminal that does not use the language desired by the caller does not exist.

If an operator terminal does not respond even when the terminal management unit 4 has called the operator terminals registered in the active list ALS in excess of a predetermined number of times or even when the total calling time is greater than a set time, the terminal management unit 4 deletes the particular operator terminal from the active list ALS. Accordingly, this arrangement is such that if the operator of an operator terminal that has been registered in the active list ALS is absent for an extended period of time because the operator is ill or on vacation, this operator terminal can be deleted from the active list so that operator connection control will subsequently be performed using only operator terminals that are truly capable of responding. This makes it possible to shorten operator connection time.

In a scenario wherein the operator terminals 5~7 connected to the network 1 are dispersed in areas for which there is a time difference relative to the location at which the terminal management unit 4 is located, the time differences between the area in which the terminal management unit 4 is located and the areas in which the operator terminals 5~7 are located are registered in the terminal management unit 4 in advance. The terminal management unit 4 obtains operator terminals, which are in an active time period, from among the operator terminals that have been registered in the active list ALS, upon taking time difference into account, and periodically calls these operator terminals. When an operator terminal responds, the terminal management unit 4 connects the caller to this operator terminal. This expedient makes it possible to shorten operator connection time because it is unnecessary to call an operator that is not currently active. In this case, the terminal management unit 4 finds an operator terminal in an area for which the time difference relative to the location of the caller is smallest, calls this operator terminal and connects the caller to this operator terminal.

Further, based upon the time differences between the area in which the terminal management unit 4 is located and the areas in which the operator terminals 5~7 are located, the terminal management unit 4 converts the active time periods of these operator terminals to time periods that prevail in the area in which the terminal management unit 4 is located and registers the time periods resulting from the conversion in the active list ALS together with the telephone numbers of the operator terminals 5~7. The terminal management unit 4 may then go to the active list ALS to find an operator terminal for which the current date and time is the date and time at which the operator terminal is active. The terminal management unit 4 calls this operator terminal periodically and, when the operator terminal responds, connects the caller to this operator terminal.

In a case where terminal management units are dispersed in areas between which there is a time difference, a management station is provided for centralized administration of these terminal management units and an operator terminal capable of terminating a call does not exist in the area to which the caller belongs, the central management station obtains the terminal management unit in an area for which the time difference is smallest relative to the area to which the caller belongs and instructs this terminal management unit to connect the caller to this operator terminal. Upon being so instructed, the terminal management unit obtains a connectable operator terminal by referring to the active list which it itself manages and then connects the caller to this operator terminal. This arrangement is such that even if an operator terminal capable of terminating a call does not exist in the area to which the caller belongs, the caller can be connected to an operator terminal which is capable of responding and is closest to the caller in terms of the time difference. This also makes it possible to reduce one's telephone bill.

The terminal management unit 4 is provided in an exchange or at the service control point in an intelligent network. If the terminal management unit 4 is provided at the service control point in an intelligent network, the burden upon the exchange can be alleviated.

Further, active lists can be dispersed over a plurality of exchanges within a network. Based upon a command from the terminal management unit 4, an exchange calls the operator terminals that have been registered in the active list and, when an operator terminal responds, calls the caller and connects the caller to this operator terminal. This arrangement alleviates the load upon the terminal management unit 4.

(a) Overall configuration

Figure 2:
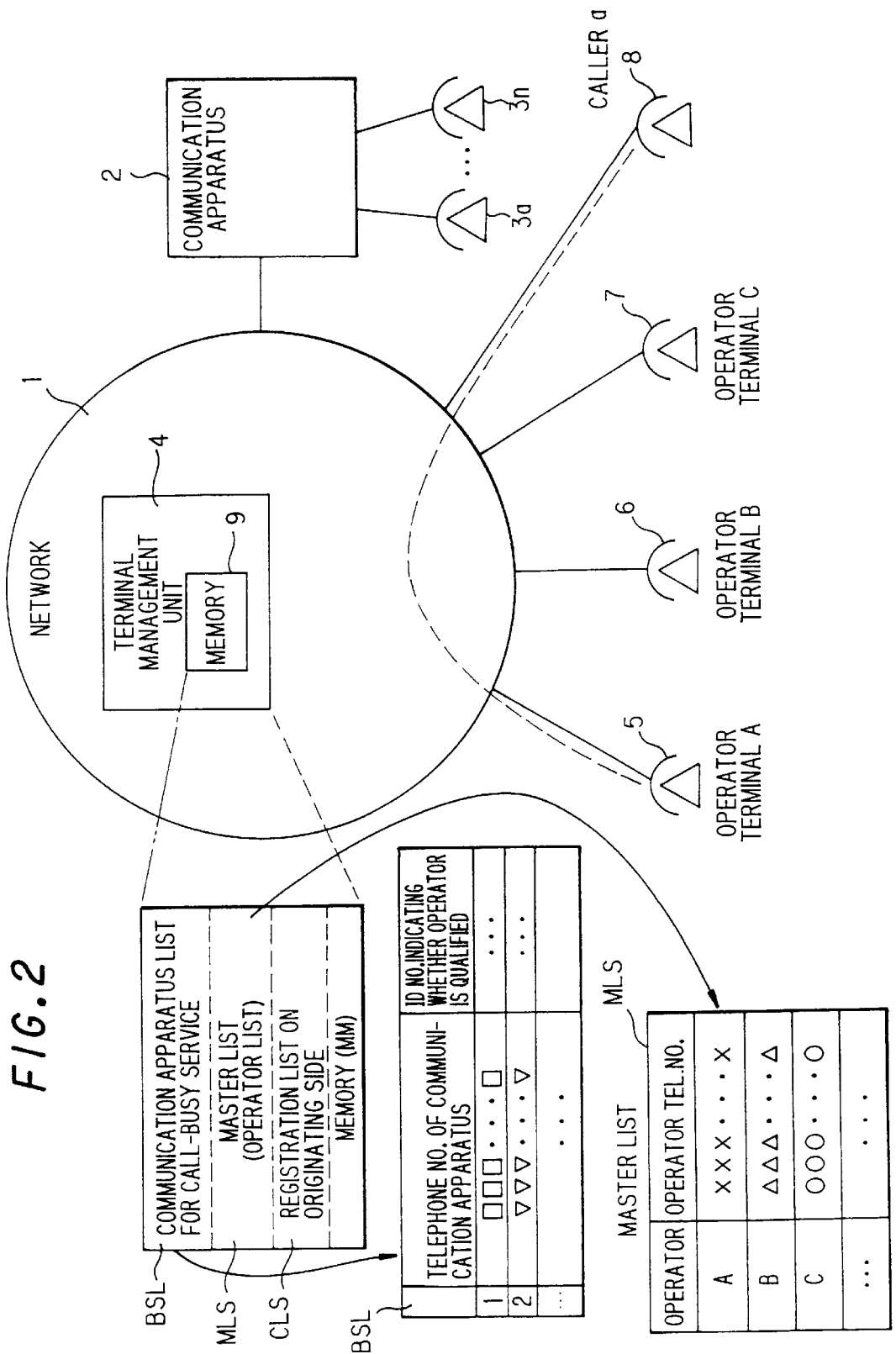
FIG. 2 is a diagram showing the overall configuration of the invention.

FIG. 2 is a diagram showing the overall configuration of a communication system in accordance with the present invention. The system includes the network 1 and the communication apparatus 2 which, at the time of incoming calls, connects the callers to the operators 3a~3n (which belong to the communication apparatus 2) and allows the operators 3a~3n to make prescribed responses to the callers. By way of example, the communication apparatus 2 would be provided at a ticket sales center or the like. The system further includes the terminal management unit 4 for executing operator connection control, as well as the operator terminals 5~7 connected to the network 1 externally of the communication apparatus 2. Numeral 8 denotes the caller (calling terminal). The terminal management unit 4 has the memory 9 storing a list BSL of communication apparatus capable of receiving the call-busy service, the master list MLS for registering operator terminals connected to the network, and the calling-side registration list CLS for registering a caller not connected to an operator because the communication apparatus was busy. Here (1) the telephone number of the communication apparatus and (2) an identification number that indicates whether the individual is or is not qualified to be an operator are entered in the communication apparatus list BSL so as to correspond to each communication apparatus that receives the call-busy service. The telephone numbers of operator terminals are entered in the master list MLS in regular order, and callers waiting to be connected are entered in the calling-side registration list CLS in regular order.

Figure 3A:
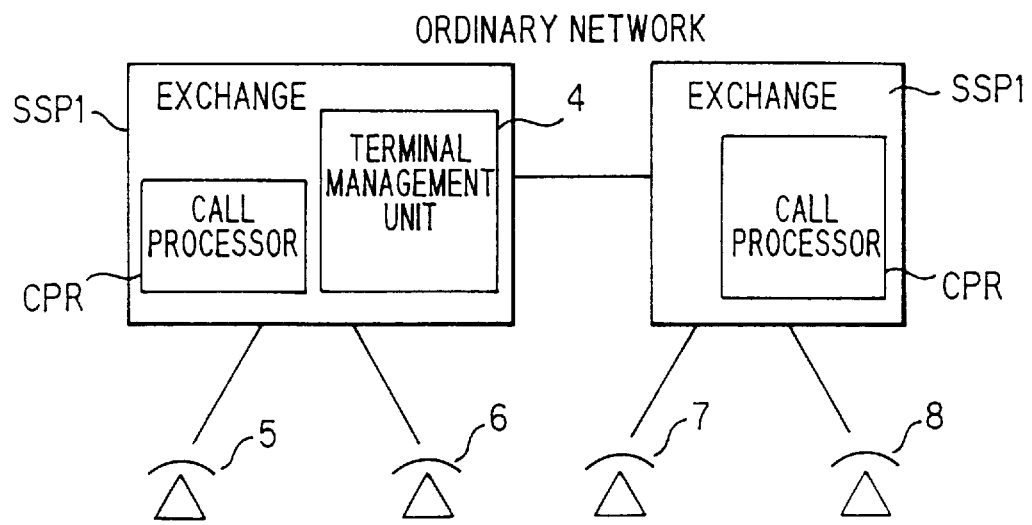
FIGS. 3A, 3B are diagrams for describing the locations of a terminal management unit.
Figure 3B:
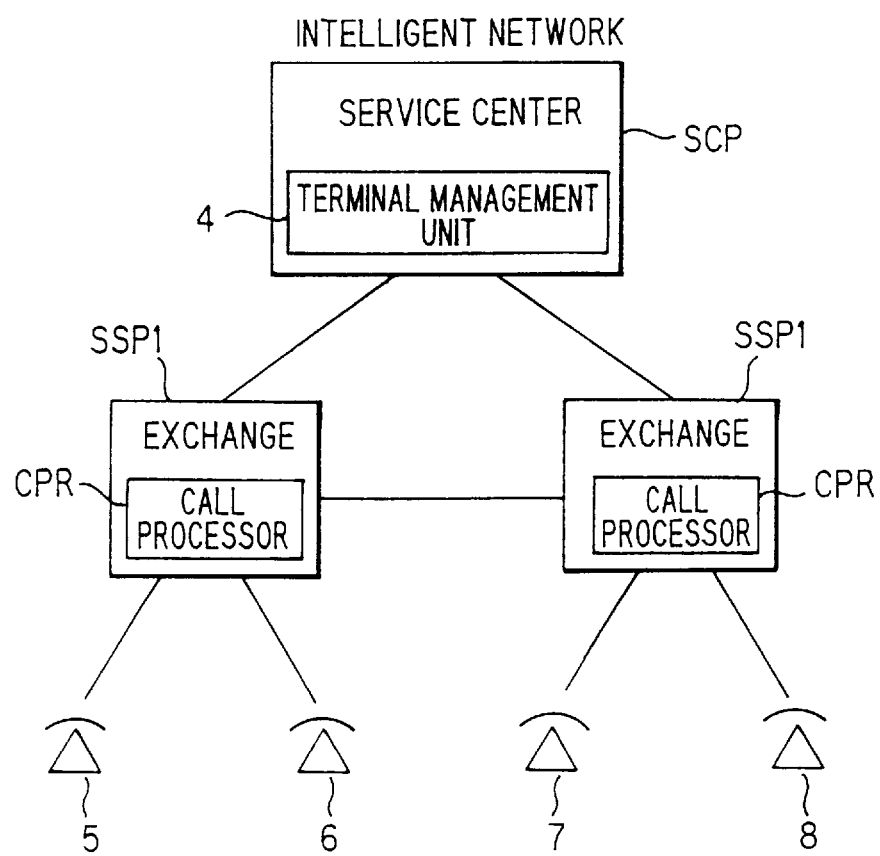

In the case of an ordinary network, the terminal management unit 4 is provided within a prescribed exchange, as illustrated in FIG. 3A. More specifically, the central processing unit CPU of the exchange implements a terminal management function, described below. In the case of an intelligent network, the terminal management unit 4 is provided within a service center SCP that executes an intelligent service, as shown in FIG. 3B. In FIGS. 3A and 3B, SSP1 and SSP2 represent exchanges (service switching points), SCP a service center (service control point) in an intelligent network, CPR a call processing, 5~7 the operator terminals and 8 a subscriber terminal.

(b) Call-busy service processing

Figure 4:
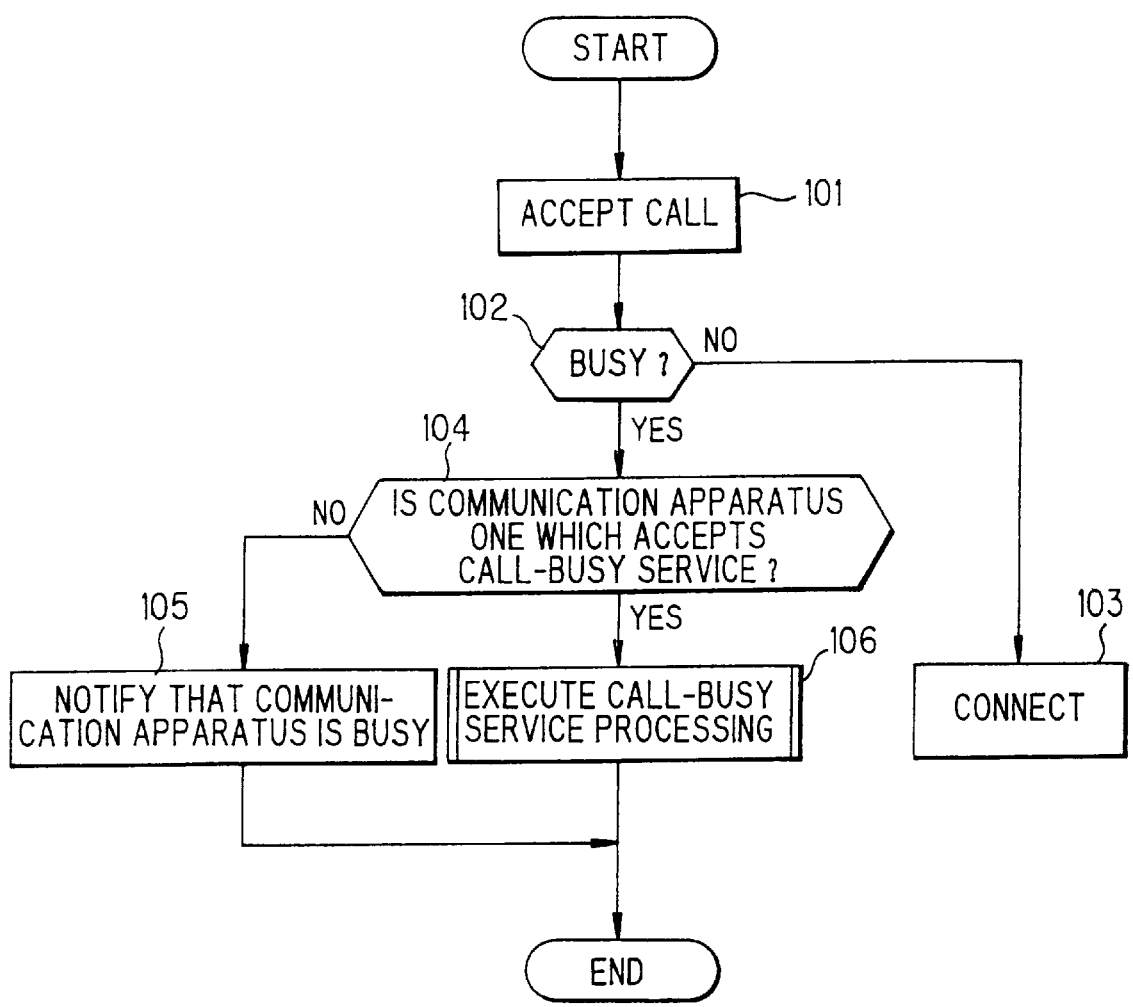
FIG. 4 is a first processing flowchart of a call-busy service.

FIGS. 4 and 5 are flowcharts illustrating processing for the call-busy service

When a call from the caller 8 (FIG. 2) arrives at the communication apparatus 2, the terminal management unit 4 determines whether the communication apparatus 2 is busy (steps 101, 102). If the communication apparatus 2 is not busy ("NO" at step 102), the terminal management unit 4 connects the caller 8 to the communication apparatus 2 and then ends connection processing (step 103). If the communication apparatus 2 is found to be busy ("YES" at step 102), however, the terminal management unit 4 refers to the communication apparatus list BSL to determine whether the communication apparatus 2 has been registered as an apparatus capable of receiving the call-busy service (step 104). If the communication apparatus 2 has not been registered as an apparatus capable of receiving the call-busy service ("NO" at step 104), the terminal management unit 4 notifies the caller 8 of the fact that the apparatus is busy and then ends connection processing (step 105). On the other hand, if the communication apparatus 2 has been registered as an apparatus capable of receiving the call-busy service ("YES" at step 104), then the terminal management unit 4 executes the call-busy service (step 106).

In the processing of FIG. 5 for executing the call-busy service, the terminal management unit 4 determines whether a free operator terminal is present in the master list MLS (step 106a). More specifically, the terminal management unit 4 successively calls, at predetermined time intervals in the order in which they were registered, the operator terminals registered in the master list MLS and determines whether an operator terminal has answered. If any operator terminal answers, the terminal management unit 4 connects the caller to this operator terminal and ends connection processing (step 106b).

If a response is not received from any of the operator terminals, the terminal management unit 4 connects an announcement unit (not shown) to the caller to describe the call-busy service to the caller and then instructs the caller to disconnect the call (step 106c). If the caller disconnects the call, the terminal management unit 4 enters the telephone number of the caller (though the telephone number of the caller arrives by transmission in the case of an ISDN) in the calling-side registration list CLS at the end of this list (step 106d).

The terminal management unit 4 thenceforth calls, periodically and successively, and at predetermined time intervals in the order in which they were registered, the operator terminals 5~7 registered in the master list MLS and determines whether an operator terminal has answered (106e). If any operator terminal (operator terminal 5, for example) answers, the terminal management unit 4 calls the caller 8 (step 106f), connects the caller to the operator terminal 5 (step 106b) and ends connection processing.

The telephone number is not entered from the calling terminal in the description rendered above. In the case of an ISDN, however, the telephone number of the caller arrives by transmission and, hence, the above-mentioned telephone number is used. However, if the telephone number does not arrive by transmission, the operator terminal is requested for the telephone number and the telephone number of the operator terminal is entered.

(c) Two-aspect management of operator terminals by two lists

The foregoing relates to a case where operator terminals are registered solely in the master list MLS. However, an arrangement can be adopted in which the call-busy service is executed by providing the memory 9 of the terminal management unit 4 with (1) a master list MLS for registering all operator terminals and (2) an active list ALS for registering those of the operator terminals that are active (i.e., that are capable of responding to a caller). FIGS. 6A and 6B show examples of the master list MLS and active list ALS, respectively. Operator terminals A~E have been registered in the master list MLS. From among these operator terminals, only operator terminals A~C capable of responding as operators have been registered in the active list ALS.

(d) Call-busy service processing using active list

FIG. 7 is a processing flowchart of a call-busy service using the active list. This flowchart corresponds to that of FIG. 5.

If the communication apparatus is busy when an incoming call arrives from the caller, the terminal management unit 4 determines whether a free operator terminal is present in the active list ALS (step 107a). More specifically, the terminal management unit 4 successively calls, at predetermined time intervals in the order in which they were registered, the operator terminals A~C registered in the active list ALS and determines whether an operator terminal has answered. If any operator terminal answers, the terminal management unit 4 connects the caller to this operator terminal and ends connection processing (step 107b).

If a response is not received from any of the operator terminals that have been registered in the active list ALS, the terminal management unit 4 connects an announcement unit to the caller to describe the call-busy service to the caller and then instructs the caller to disconnect the call (step 10c). If the caller disconnects the call, the terminal management unit 4 enters the telephone number of the caller in the calling-side registration list CLS at the end of this list (step 107d).

The terminal management unit 4 thenceforth calls, periodically and successively, and at predetermined time intervals in the order in which they were registered, the operator terminals A~C registered in the active list ALS and determines whether an operator terminal has answered (107e). If any operator terminal answers, the terminal management unit 4 calls the caller that has been registered at the top of the calling-side registration list CLS (step 107f), connects the caller to this operator terminal (step 107b) and ends connection processing.

Figure 8:
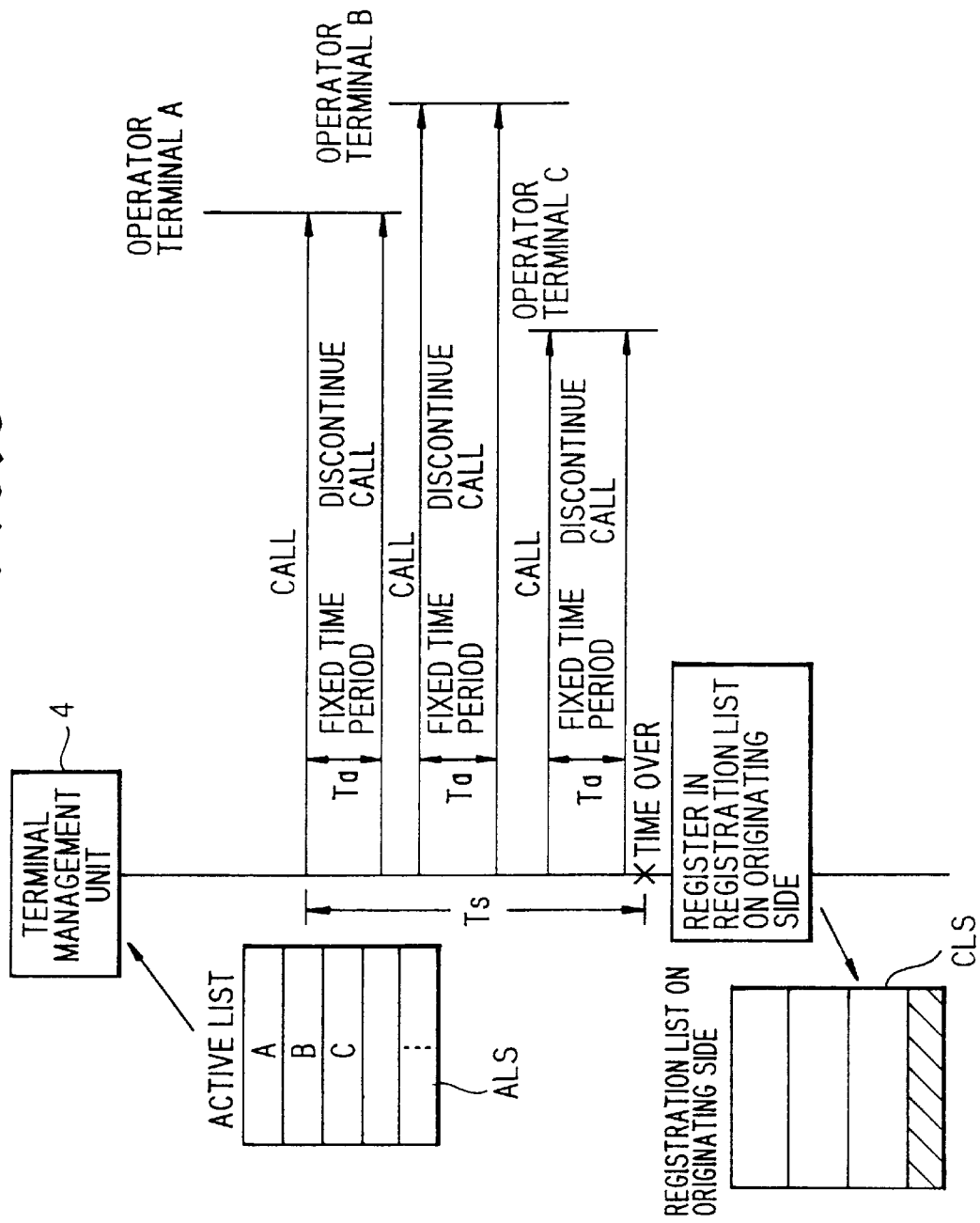
FIG. 8 is a diagram for describing a first procedure for retrieving free operator terminals.

(e) Procedure for retrieving free operator terminal (e-1) Procedure for retrieving free operator terminal at step 107a FIG. 8 is a diagram for describing a procedure for retrieving a free operator terminal. This procedure corresponds to step 107a of FIG. 7.

The terminal management unit 4 calls, in the order in which they were registered, the operator terminals A~C registered in the active list ALS. More specifically, the terminal management unit 4 calls the operator terminal A first. If the operator terminal A does not respond or is found to be busy even after being called for a fixed period of time Ta, the terminal management unit 4 stops calling the operator terminal A and then calls the operator terminal B. Similarly, if the operator terminal B does not respond or is found to be busy even after being called for the fixed period of time Ta, the terminal management unit 4 stops calling the operator terminal B and then calls the operator terminal C. If the operator terminal C does not respond or is found to be busy even after being called for the fixed period of time Ta, the terminal management unit 4 stops calling the operator terminal C. Thereafter, and in similar fashion, the terminal management unit 4 successively changes over the called operator terminal in the order in which the operator terminals were registered in the active list until a response is obtained, or until the number of calls attains a set number, or until the total call time attains a set time Ts.

If an operator terminal does not respond even when the number of calls attains the set number or the total call time attains the set time Ts, the terminal management unit 4 stops calling and urges the caller to disconnect. When the caller disconnects, the terminal management unit 4 enters the telephone number of the caller in the calling-side registration list CLS at the bottom of the list.

(e-2) Procedure for retrieving free operator terminal at step 107e

Figure 9:
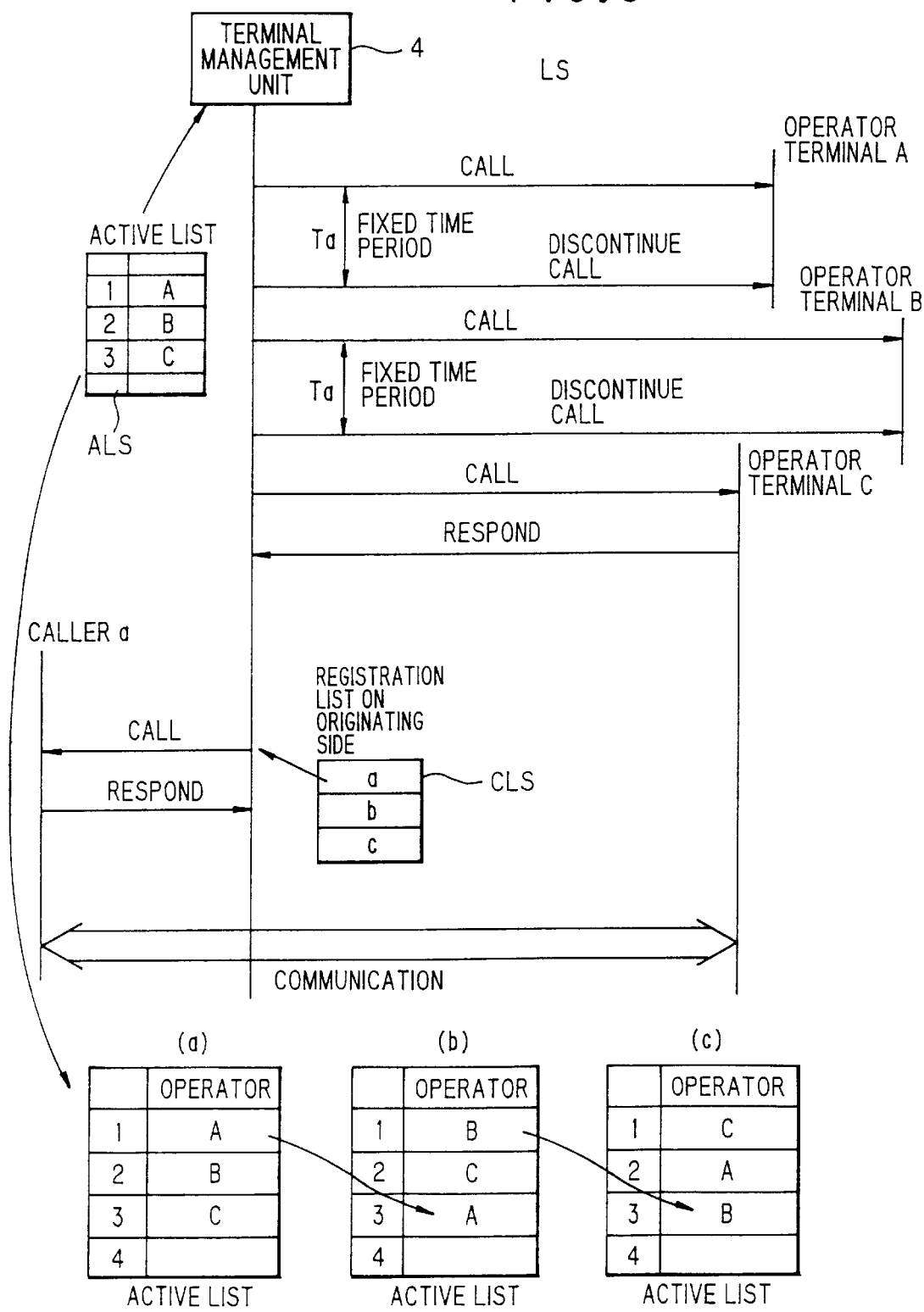
FIG. 9 is a diagram for describing a second procedure for retrieving free operator terminals.

FIG. 9 is a diagram for describing another procedure for retrieving a free operator terminal. This procedure corresponds to step 107e of FIG. 7.

The terminal management unit 4 calls, in the order in which they were registered, the operator terminals A~C registered in the active list ALS. More specifically, the terminal management unit 4 calls the operator terminal A first. If the operator terminal A does not respond or is found to be busy even after being called for a fixed period of time Ta, the terminal management unit 4 stops calling the operator terminal A and shifts the operator terminal A to the bottom of the active list ALS. Next, the terminal management unit 4 calls the operator terminal B. If the operator terminal B does not respond or is found to be busy even after being called for a fixed period of time Ta, the terminal management unit 4 stops calling the operator terminal B and shifts the operator terminal B to the bottom of the active list ALS. The terminal management unit 4 then calls the next operator terminal C and subsequently changes over the operator terminal in similar fashion. If the operator terminal C responds, the terminal management unit 4 calls a caller a registered at the top of the calling-side registration list CLS. If the caller a responds, then the terminal management unit 4 connects the caller a and the operator terminal C.

Figure 10:
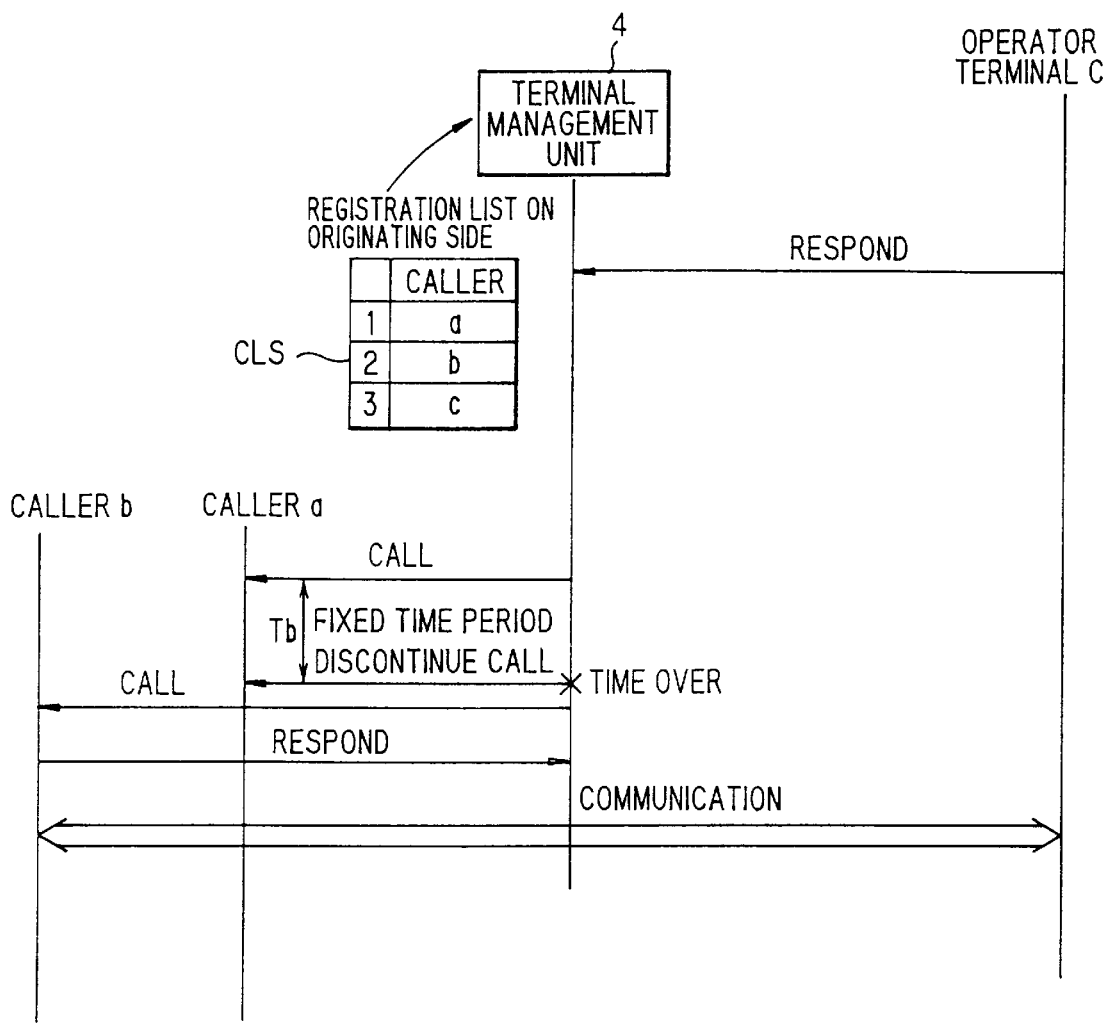
FIG. 10 is a diagram for describing a procedure through which a caller is connected to an operator terminal.

In a case where the caller a at the top of the list fails to respond upon elapse of a fixed time Tb, the terminal management unit 4 shifts the caller a to the bottom of the calling-side registration list CLS, as shown in FIG. 10, and calls the next caller b. If the caller b responds, the terminal management unit 4 connects the caller b and the operator terminal C and ends connection control.

(f) Processing for automatically deleting operator terminals from active list

There are occasions where the operator of an operator terminal that has been registered in the active list ALS goes absent for an extending period of time owing to vacation or illness without deleting this operator terminal from the active list. In such case, regardless of the fact that this operator terminal will not respond, control is executed to call this operator terminal at steps 107*a*, 107*e* in FIG. 7. This control is meaningless and lengthens operator connection time. Accordingly, it is so arranged that when an operator terminal fails to respond a prescribed number of times in succession, this operator terminal is deleted from the active list. In order to delete a non-responding operator terminal from the active list ALS, the telephone numbers of the operator terminals and the number NR of times they fail to respond are stored in the active list ALS, as shown in FIG. 11.

Figures 11, 12:
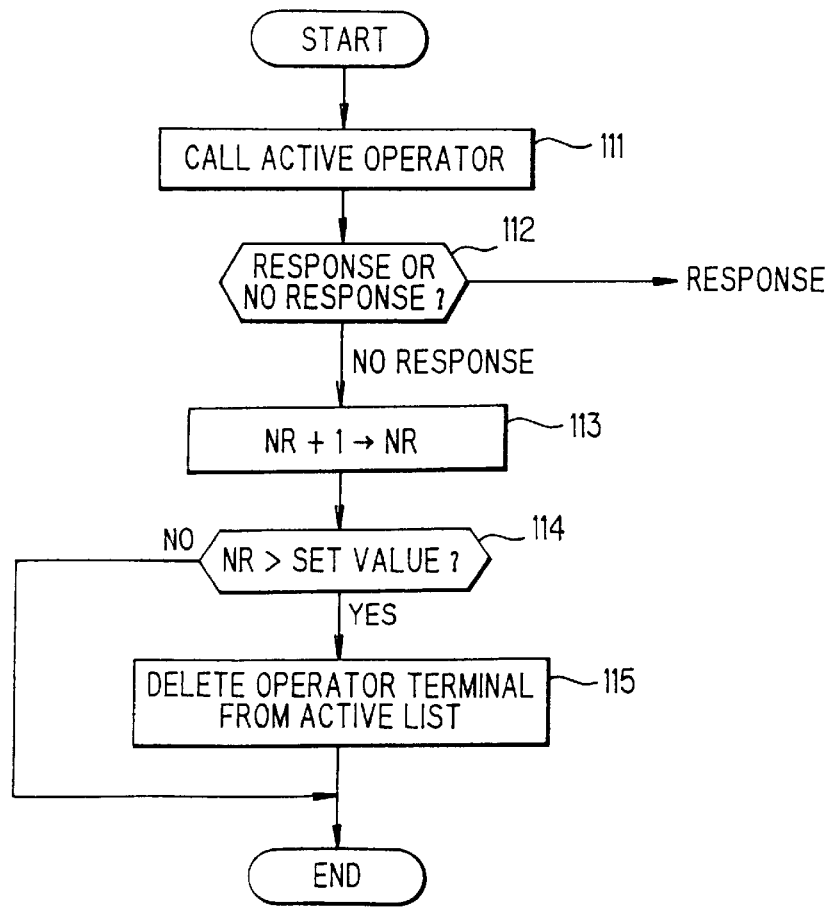
FIG. 11 is a diagram for describing an active list containing the number of times a call is not answered.
FIG. 12 is a flowchart of processing for deleting an operator terminal from the active list.

FIG. 12 is a flowchart of processing for automatically deleting an operator terminal from the active list. At step 107*e* of FIG. 7, the terminal management unit 4 calls, in the order in which they were registered, the operator terminals registered in the active list ALS (step 111). If an operator terminal does not respond even upon being called for a prescribed period of time (step 112), the number NR of non-responses of the operator terminal is incremented (NR+1→NR; step 113). Next, the terminal management unit 4 determines whether the number NR of non-responses is greater than a set number (step 114). If NR is found to be greater than the set value, this operator terminal is deleted from the active list ALS (step 115).

If this arrangement is adopted, the above-mentioned operator terminal can be deleted from the active list automatically, after which operator connection control is performed is performed using solely the operator terminals capable of truly responding. This makes it possible to shorten operator connection time. It should be noted that if an operator terminal has responded, its number NR is reset to zero.

(g) Processing for registering operator terminals in master list

Figure 13:
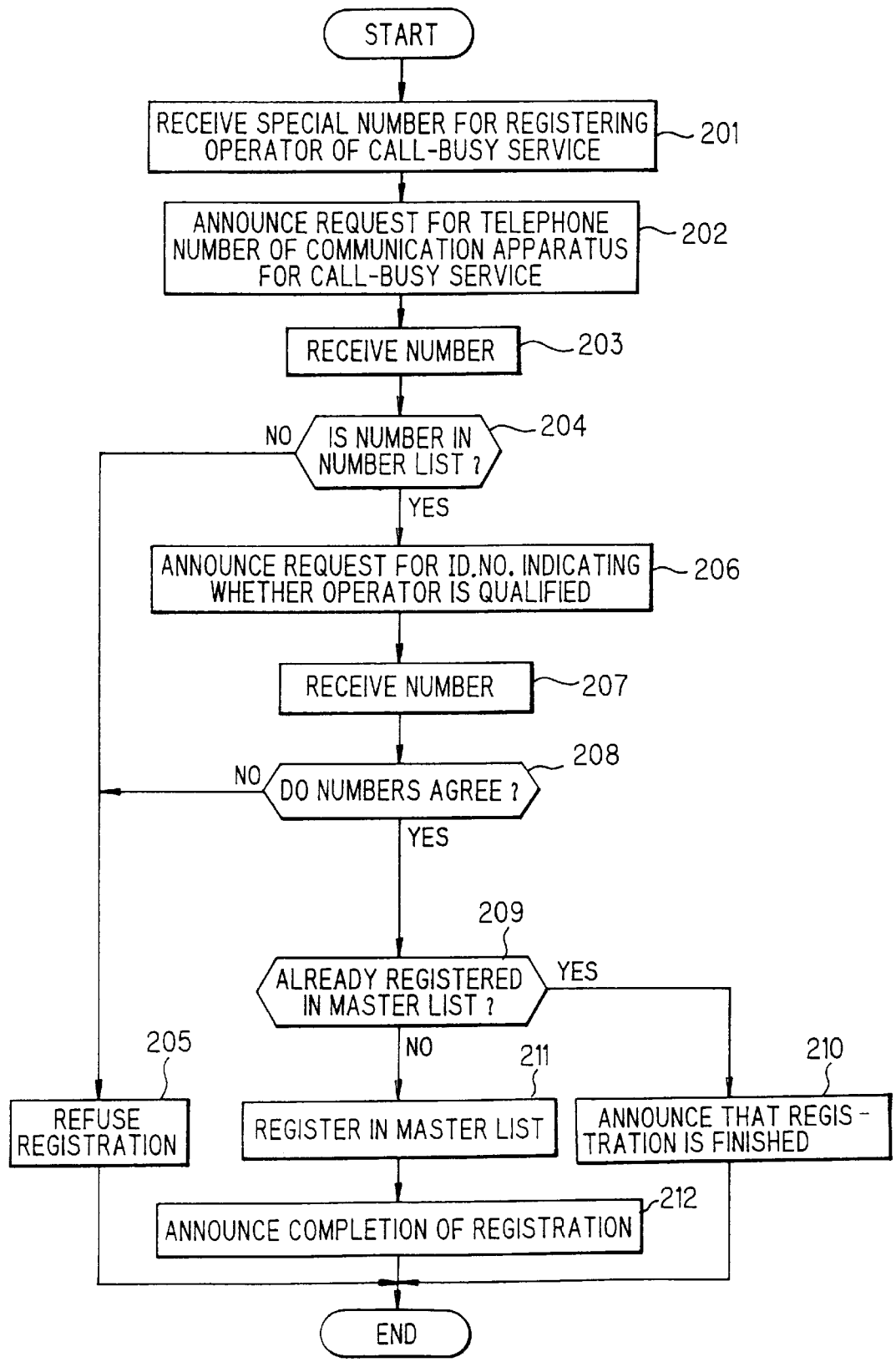
FIG. 13 is a flowchart of processing for registering an operator terminal in a master list.

FIG. 13 is a flowchart of processing for registering an operator terminal in the master list. The assumption here is that the operator enters into an agreement with a concern such as a ticket vending center and that the operator identification number indicating whether the operator is qualified or not is known.

The operator manipulates a terminal located at his/her residence and sends the terminal management unit 4 a special number for registering an operator of the call-busy service. Upon receiving the special number (step 201), the terminal management unit 4 connects the announcement machine to the operator terminal, prompts the operator to enter the telephone number of the communication apparatus registered for acceptance of the call-busy service and receives the number from the operator terminal (steps 202, 203). When the number is received, the terminal management unit 4 determines whether this number is present in the communication apparatus list BSL (step 204). If the number is not found ("NO" at step 204), then the terminal management unit 4 denies registration (step 205) and ends registration processing.

If the number received is present in the communication apparatus list BSL ("YES" at step 204), then the terminal management unit 4 plays an announcement to prompt entry of the identification number indicating whether the operator is qualified or not (step 206). If the number is received (step 207), the terminal management unit 4 determines whether this number agrees with an operator qualification identification number assigned to the communication apparatus (step 208). If the two numbers do not agree ("NO" at step 208), registration is denied (step 205) and registration processing is ended.

If the number received agrees with the operator qualification identification number, it is determined whether the telephone number of the operator terminal has already been registered in the master list MLS (step 209). If the telephone number has already been registered, then the terminal management unit 4 gives notification of the fact that registration is finished (step 210) and ends registration processing.

If the telephone number has not been registered, however, then the terminal management unit 4 registers the telephone number of the operator terminal in the master list MLS (step 211), notifies the operator terminal of completion of registration (step 212) and ends registration processing.

The telephone number is not entered from the operator terminal in the description rendered above. In the case of an ISDN, however, the telephone number of the caller arrives by transmission and, hence, the processing of step 209 is executed using the above-mentioned telephone number. However, if the telephone number does not arrive by transmission, the operator terminal is requested for the telephone number and the telephone number of the operator terminal is entered and then step 209 is executed.

(h) Processing for deleting operator terminals from master list

Figure 14:
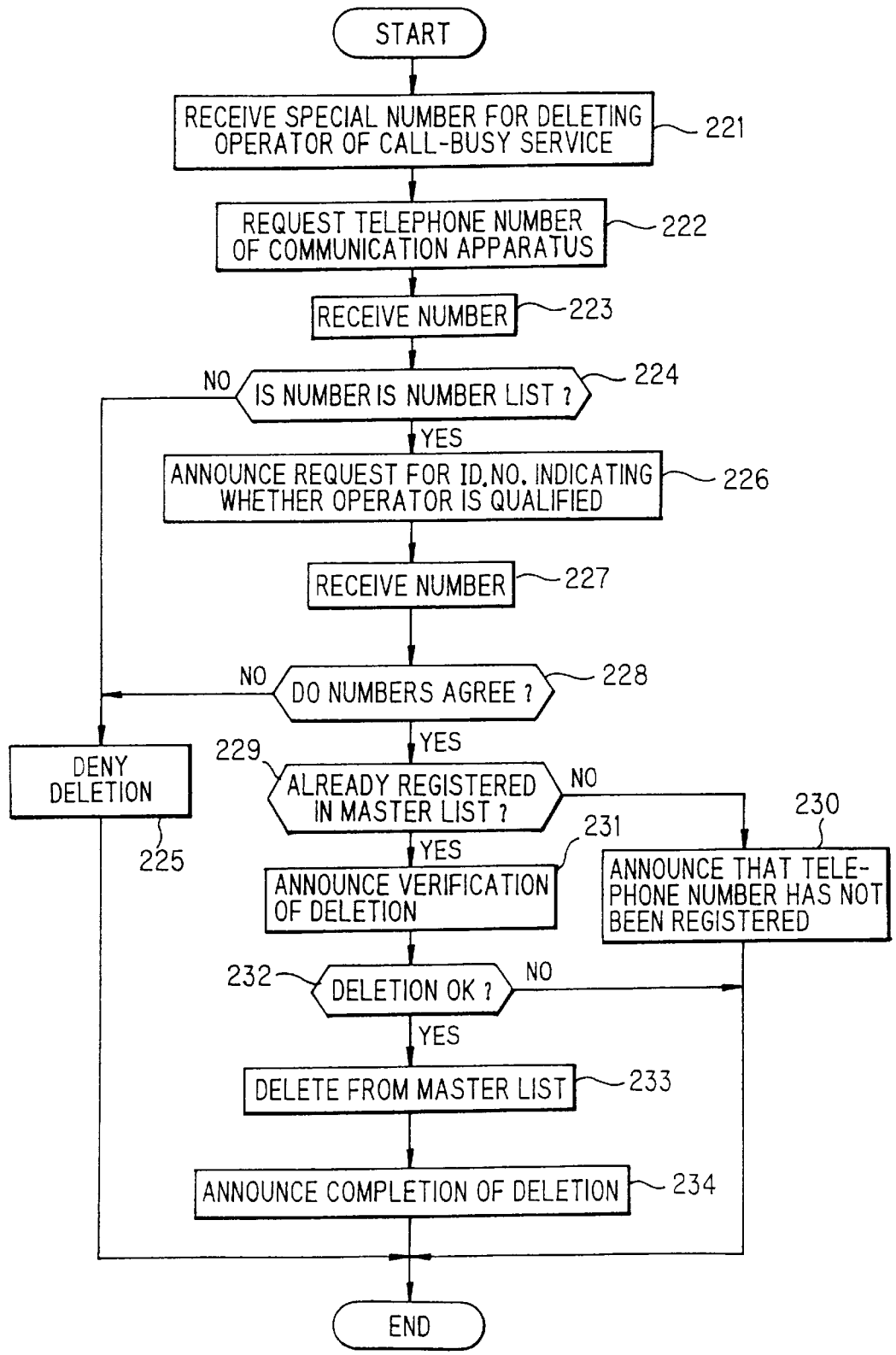
FIG. 14 is a flowchart of processing for deleting an operator terminal from the master list.

FIG. 14 is a flowchart of processing for deleting an operator terminal from the master list.

The operator manipulates an operator terminal located at his/her residence and sends the terminal management unit 4 a special number for deleting an operator of the call-busy service. Upon receiving the special number (step 221), the terminal management unit 4 connects the announcement machine to the operator terminal, prompts the operator to enter the telephone number of the communication apparatus and receives the number from the operator terminal (steps 222, 223). When the number is received, the terminal management unit 4 determines whether this number is present in the communication apparatus list BSL (step 224). If the number is not found ("NO" at step 224), then the terminal management unit 4 denies deletion (step 225) and ends deletion processing.

If the number received is present in the communication apparatus list BSL ("YES" at step 224), then the terminal management unit 4 plays an announcement to prompt entry of the identification number indicating whether the operator is qualified or not (step 226). If the number is received (step 227), the terminal management unit 4 determines whether this number agrees with an operator qualification identification number assigned to the communication apparatus (step 228). If the two numbers do not agree ("NO" at step 224), deletion is denied (step 225) and deletion processing is ended.

If the number received agrees with the operator qualification identification number, it is determined whether the telephone number of the operator terminal has already been registered in the master list MLS (step 229). If the telephone number has not been registered, the terminal management unit 4 gives notification of this fact (step 230) and ends deletion processing.

If the telephone number has been registered, on the other hand, the terminal management unit 4 plays a verification message announcement asking whether it is permissible to make the deletion (step 231). If the answer is deletion "NO" (step 232), the terminal management unit 4 ends deletion processing. If the answer is deletion "OK" (step 232), then the terminal management unit 4 deletes the telephone number of the operator terminal from the master list (step 233), notifies the operator terminal of the fact that deletion is completed (step 234) and ends deletion processing.

(i) Processing for registering operator terminals in active list

Figure 15:
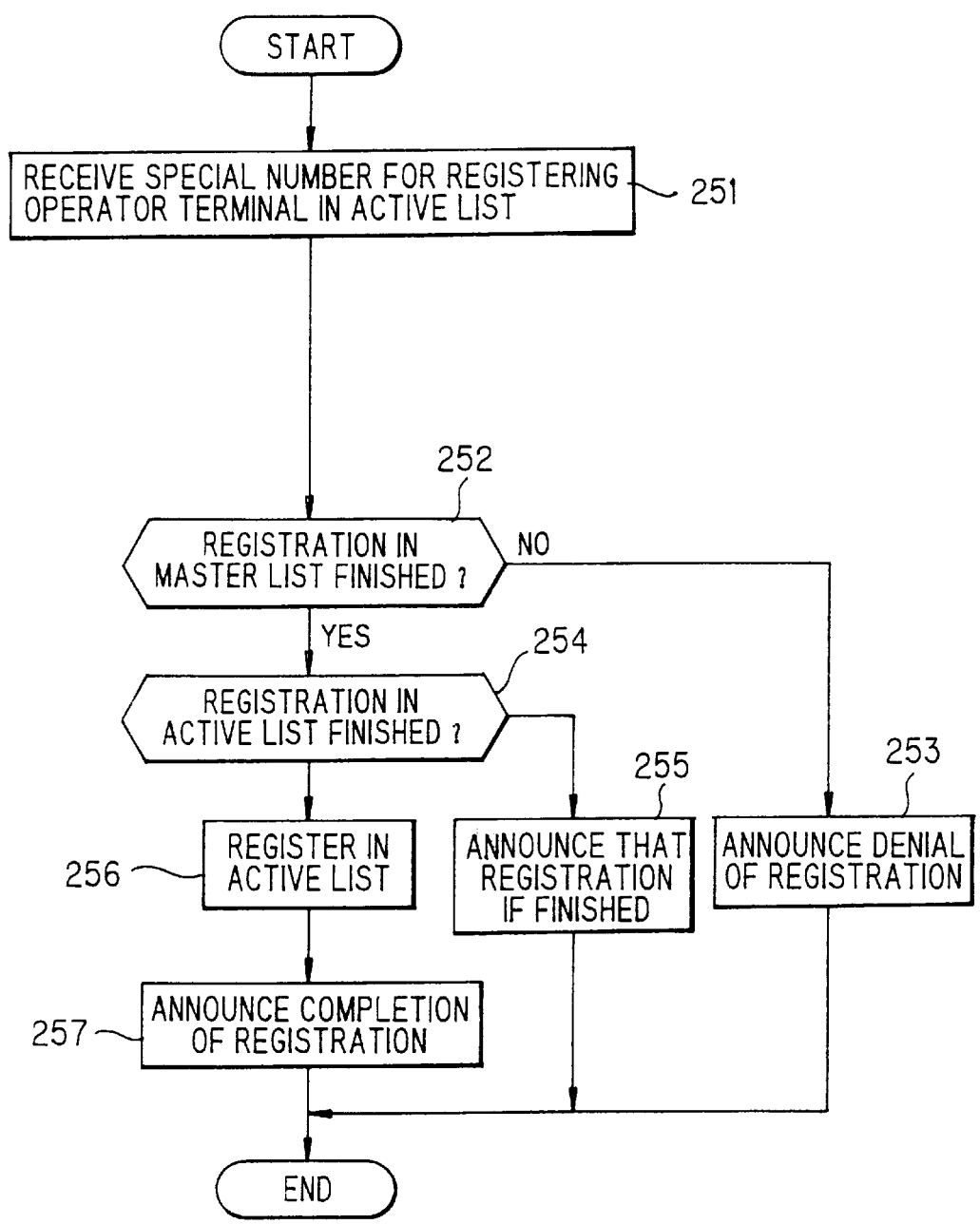
FIG. 15 is a flowchart of processing for registering an operator terminal in the active list.

FIG. 15 is a flowchart of processing for registering an operator terminal in the active list.

The operator manipulates an operator terminal located at his/her residence and sends the terminal management unit 4 a special number for registering an operator terminal in the active list. Upon receiving the special number (step 251), the terminal management unit 4 determines whether the telephone number of the operator terminal has been registered in the master list (step 252). If the telephone number has not been registered, the terminal management unit 4 denies registration (step 253). If the telephone number has been registered in the master list MLS, then the terminal management unit 4 determines whether the telephone number of the operator terminal has already been registered in the active list ALS (step 254). If the telephone number has been registered, the terminal management unit 4 gives notification of this fact (step 255) and ends registration processing.

If the telephone number has not been registered, then the terminal management unit 4 registers the telephone number of the operator terminal in the active list ALS (step 256), notifies the operator terminal of completion of registration (step 257) and ends registration processing.

The telephone number is not entered from the operator terminal in the description rendered above. In the case of an ISDN, however, the telephone number of the caller arrives by transmission and, hence, the above-mentioned telephone number is used. However, if the telephone number does not arrive by transmission, the operator terminal is requested for the telephone number and the telephone number of the operator terminal is entered.

(j) Processing for deleting operator terminals from active list

Figure 16:
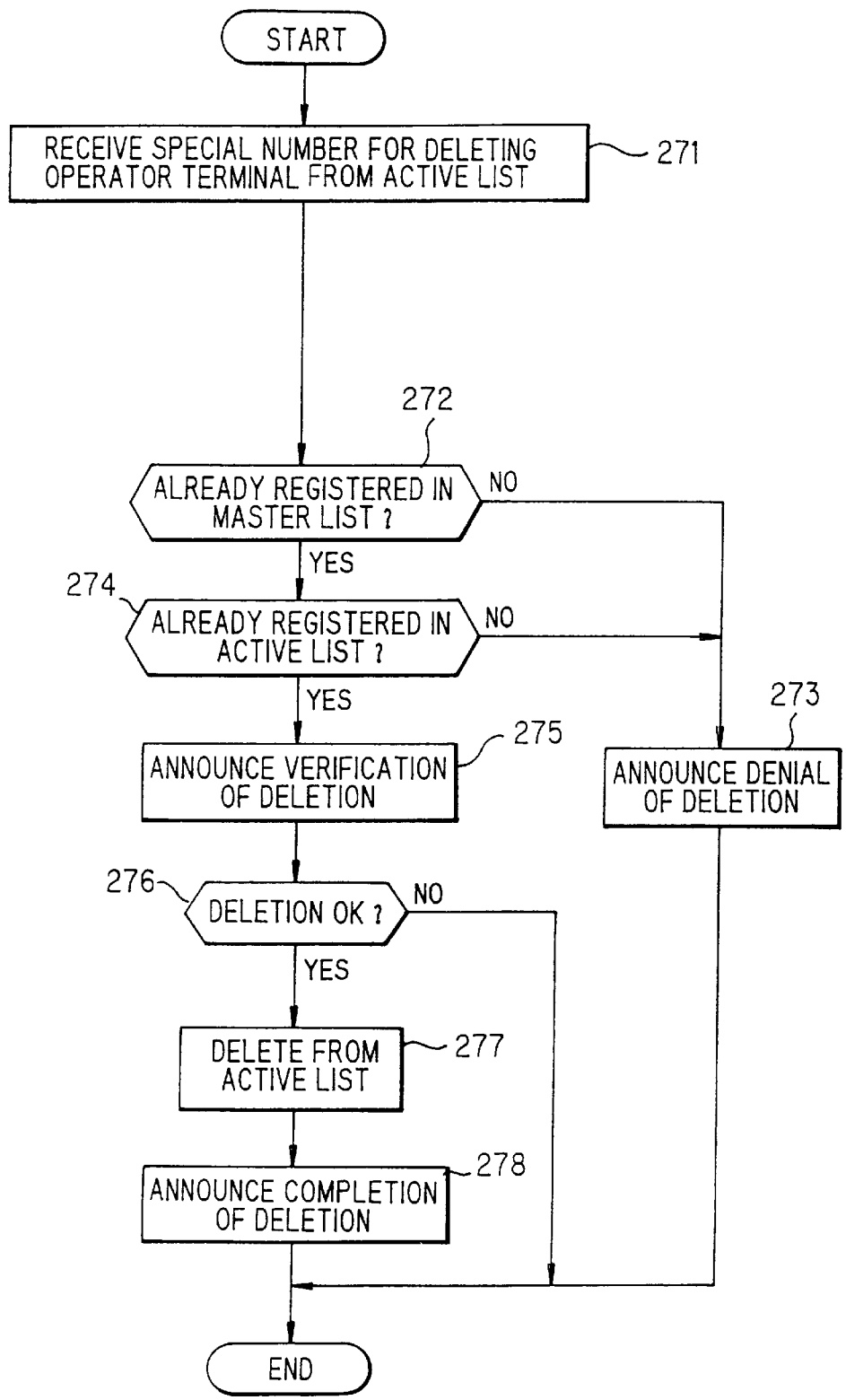
FIG. 16 is a flowchart of processing for deleting an operator terminal from the active list.

FIG. 16 is a flowchart of processing for deleting an operator terminal from the active list.

The operator manipulates an operator terminal located at his/her residence and sends the terminal management unit 4 a special number for deleting an operator terminal from the active list. Upon receiving the special number (step 271), the terminal management unit 4 determines whether the telephone number of the operator terminal has been registered in the master list (step 272). If the telephone number has not been registered, the terminal management unit 4 denies deletion (step 273) and ends deletion processing.

If the telephone number has been registered in the master list MLS, then the terminal management unit 4 determines whether the telephone number of the operator terminal has already been registered in the active list ALS (step 274). If the telephone number has not been registered, then deletion is refused (step 273) and deletion processing is ended.

If the telephone number has been registered, on the other hand, the terminal management unit 4 plays a verification message announcement asking whether it is permissible to make the deletion (step 275). If the answer is deletion "NO" (step 276), the terminal management unit 4 ends deletion processing. If the answer is deletion "OK", then the terminal management unit 4 deletes the telephone number of the operator terminal from the active list (step 277), notifies the operator terminal of the fact that deletion is completed (step 278) and ends deletion processing.

(k) Other processing for registering operator terminals in master list

If, when an operator terminal is registered in the master list VMS, the active day or time period of the operator is registered at the same time, it can be so arranged that the terminal management unit 4, at step 107e in FIG. 7, periodically calls only operator terminals currently active from the active list and, when an operator terminal responds, calls the caller registered in the calling-side registration list CLS and connects the caller to this operator terminal. In other words, by calling and dealing with only operator terminals capable of actually responding, operator connection time can be shortened.

If, when an operator terminal is registered in the master list MLS, the language used by the operator is registered at the same time, it can be so arranged that the terminal management unit 4 obtains operator terminals of the language desired by the caller from the active list ALS, periodically calls these operator terminals and, when an operator terminal responds, connects the caller to this operator terminal. In other words, the caller can be connected to an operator terminal that is capable of responding in the language desired by the caller.

Accordingly, when an operator terminal is registered in the master list, operation conditions such as the active day of this operator terminal, its active time period and the language used are entered simultaneously and registered in the master list.

Figure 17:
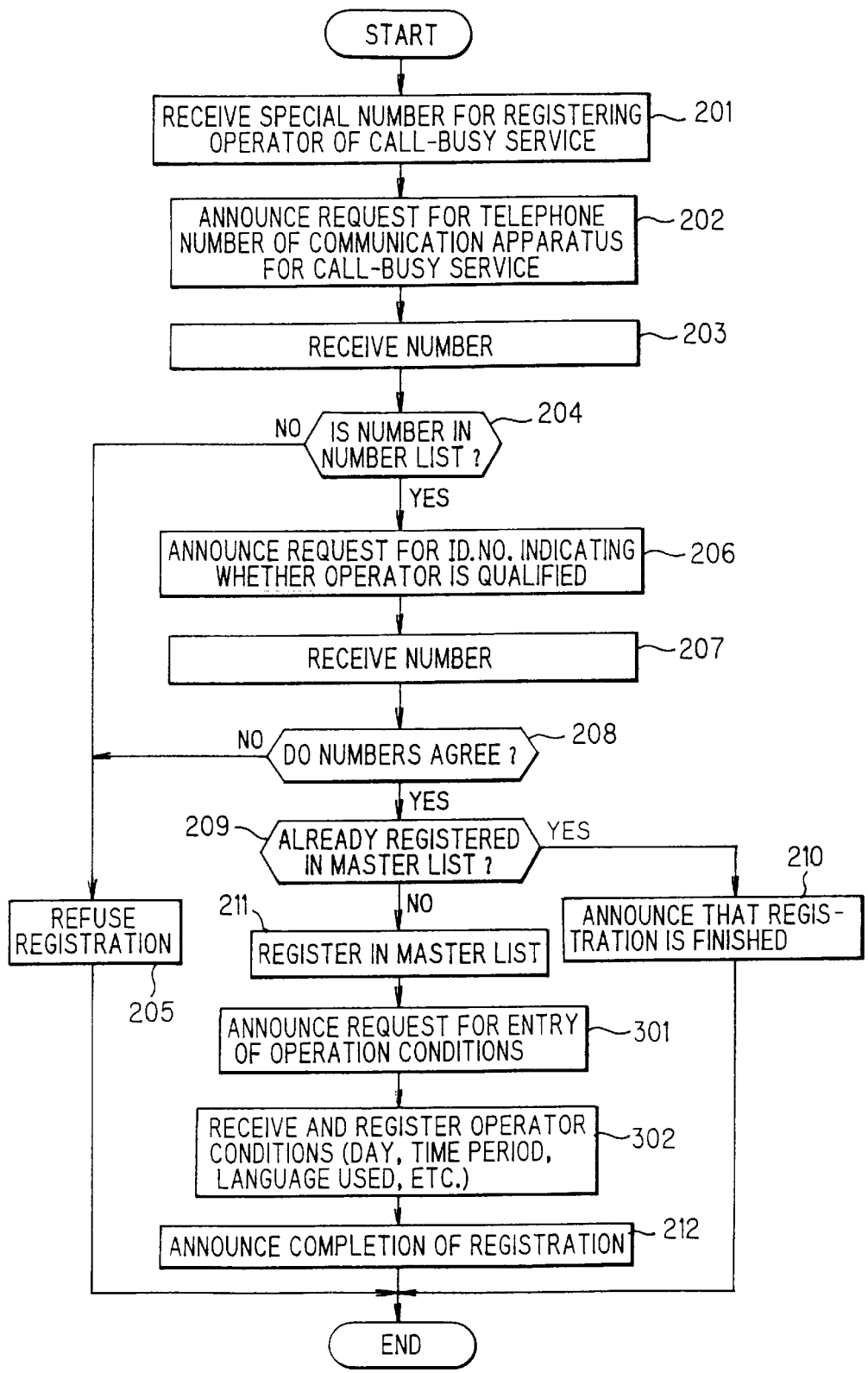
FIG. 17 is a flowchart (inclusive of operator conditions) of processing for registering an operator terminal in the master list.

FIG. 17 is a flowchart (inclusive of operator conditions) of such processing for registering an operator terminal in the master list. Step numbers identical with those shown in FIG. 13 are designated by like reference characters. This processing differs from that of FIG. 13 in steps 301 and 302.

After registering the telephone number of the operator terminal in the master list at step 211, the terminal management unit 4 sends an announcement to the operator terminal so as to prompt entry of the operator conditions (active day, active time period, language used, etc.) (step 301). If the operator responds to this announcement by entering the active day (month, date or day), the active time period and the language used, then the terminal management unit 4 registers the active day, active time period and language used in the master list MLS together with the telephone number of the operator terminal, as shown in FIG. 18 (step 302).

(l) Call-busy service processing taking activity conditions into account

Figure 19:
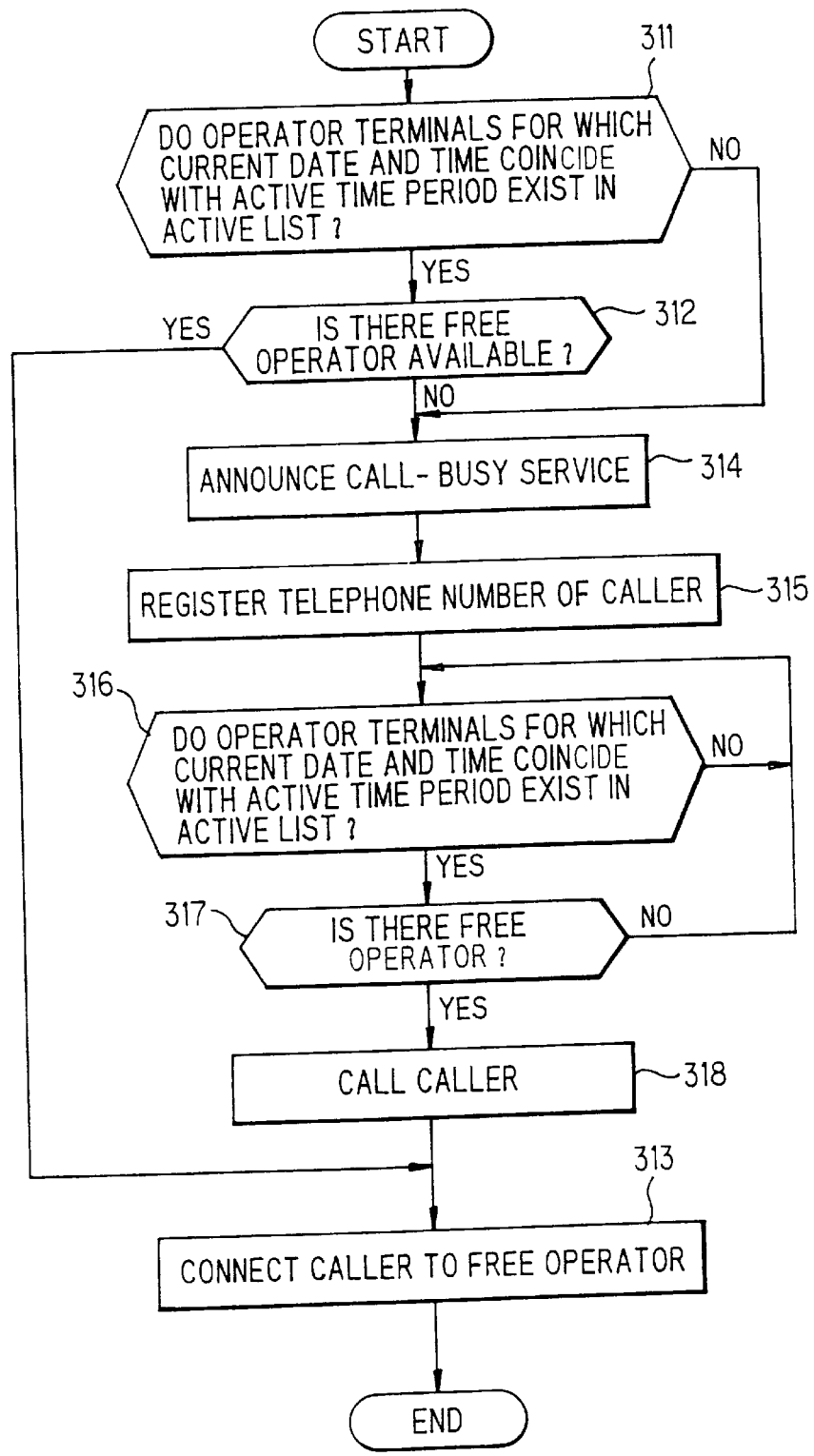
FIG. 19 is a flowchart of processing for a call-busy service that takes an operator activity condition (active time period) into account.

FIG. 19 is a flowchart of processing for a call-busy service that takes operator activity condition (active time period) into account.

If the communication apparatus is busy, the terminal management unit 4 refers to the active list ALS and master list MLS to determine whether operator terminals for which the current date and time coincide with the active time period exist (step 311). If such operator terminals exists, the terminal management unit 4 determines whether these operator terminals include a free operator terminal (step 312). In other words, the terminal management unit 4 successively calls, at predetermined time intervals in the order in which they were registered, the operator terminals that satisfy the condition of step 311, and determines whether an operator terminal has responded. If any operator terminal responds, then the terminal management unit 4 connects the caller to this operator terminal (step 313) and ends connection processing.

If an operator terminal for which the current date and time coincide with the active time period is found not to exist at step 311, or if none of the operator terminals respond at step 312, the terminal management unit 4 describes the call-busy service to the caller and instructs the caller to disconnect the call (step 314). When the caller disconnects the call, the terminal management unit 4 enters the telephone number of the caller at the bottom of the calling-side registration list CLS (step 315).

The terminal management unit 4 subsequently refers to the active list ALS and master list MLS periodically to determine whether operators for which the current date and time coincide with the active time period exist (step 316). If such operator terminals exist, the terminal management unit 4 successively calls the operator terminals at predetermined time intervals and determines whether an operator terminal has responded (step 317). If any operator terminal responds, then the terminal management unit 4 calls the caller registered at the top of the calling-side registration list CLS (step 318), connects this caller to the operator terminal (step 313) and ends connection processing.

If this arrangement is adopted, operator connection time can be shortened by adopting only operator terminals capable of actually responding as terminals that are called.

(m) Call-busy service processing taking operator language into account

Figure 20:
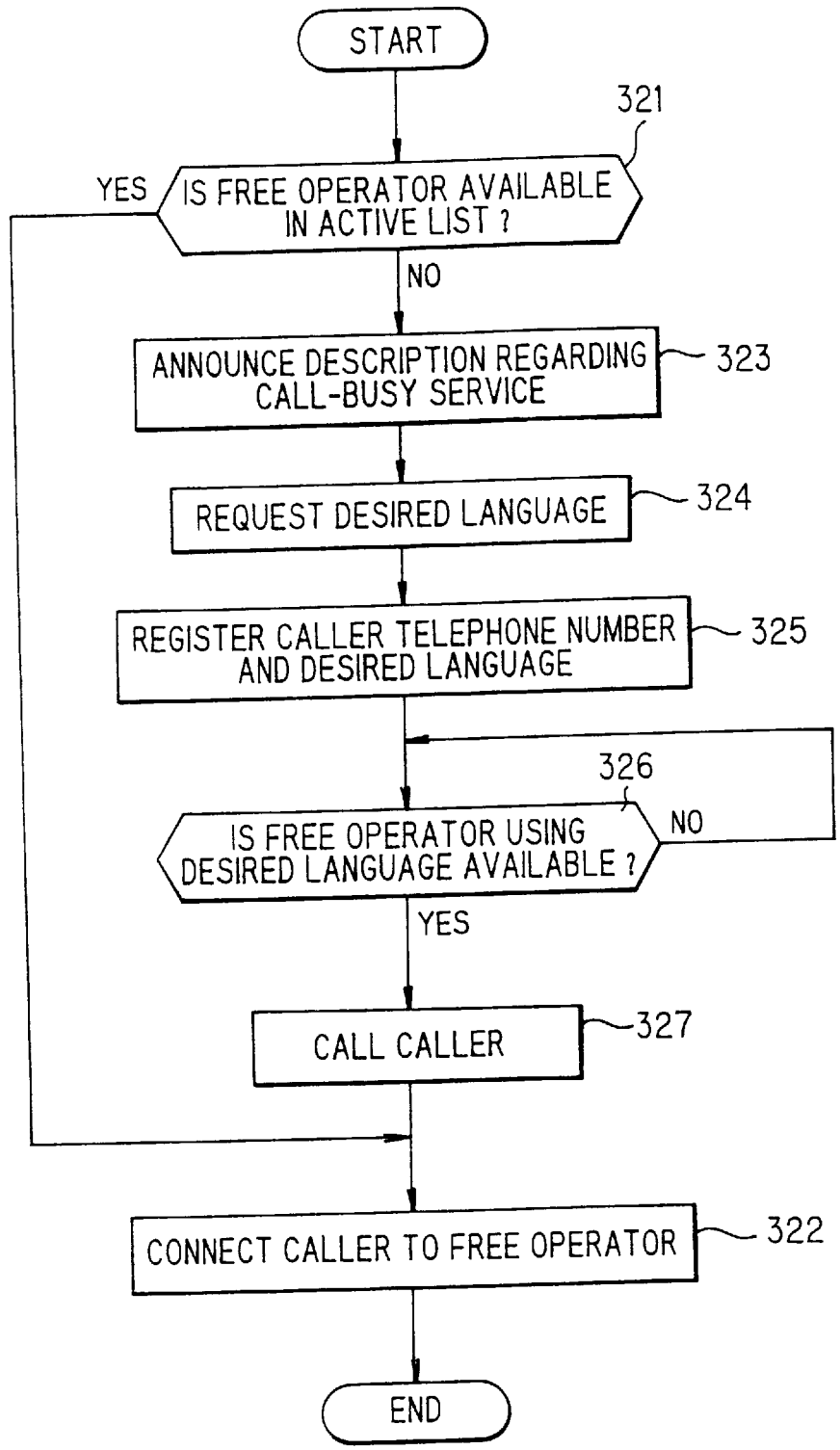
FIG. 20 is a flowchart of processing for a call-busy service that takes the language used by an operator into account.

FIG. 20 is a flowchart of processing for a call-busy service that takes the language used by an operator into account.

If the communication apparatus is busy, the terminal management unit 4 refers to the active list ALS to determine whether it contains a free operator terminal (step 321). In other words, the terminal management unit 4 successively calls, at predetermined time intervals in the order in which they were registered, the operator terminals that have been registered in the active list ALS and determines whether an operator terminal has responded. If any operator terminal responds, then the terminal management unit 4 connects the caller to this operator terminal and ends connection processing (step 322).

If none of the operator terminals that have been registered in the active list respond, then the terminal management unit 4 connects the caller to the announcement unit to describe the call-busy service (step 323) and instructs the caller to enter the desired language and to disconnect the call (step 324). If the caller disconnects the call after entering the desired language, the terminal management unit 4 enters the telephone number of the caller at the end of the calling-side registration list CLS along with the desired language (step 325).

The terminal management unit 4 thenceforth refers to the active list ALS and master list MLS to determine whether operator terminals for which the language is the language desired by the caller at the top of the calling-side registration list CLS are present. If such operator terminals are present, the terminal management unit 4 determines whether these operator terminals include a free operator terminal (step 326). In other words, the terminal management unit 4 successively calls, at predetermined time intervals, the operator terminals that satisfy the above-mentioned condition and determines when an operator terminal has responded. If any operator terminal responds, the terminal management unit 4 calls the caller (step 327), connects the caller to this operator terminal (step 322) and ends connection processing. If this arrangement is adopted, an operator whose language is that desired by the caller can be connected to the caller.

Though the languages used are registered in the master list MLS so as to correspond to the operator terminals, it can be so arranged that the languages used can be registered in the active list ALS as well so as to correspond to the operator terminals. If this arrangement is adopted, it will be unnecessary to refer to the master list MLS each time.

Figure 21:
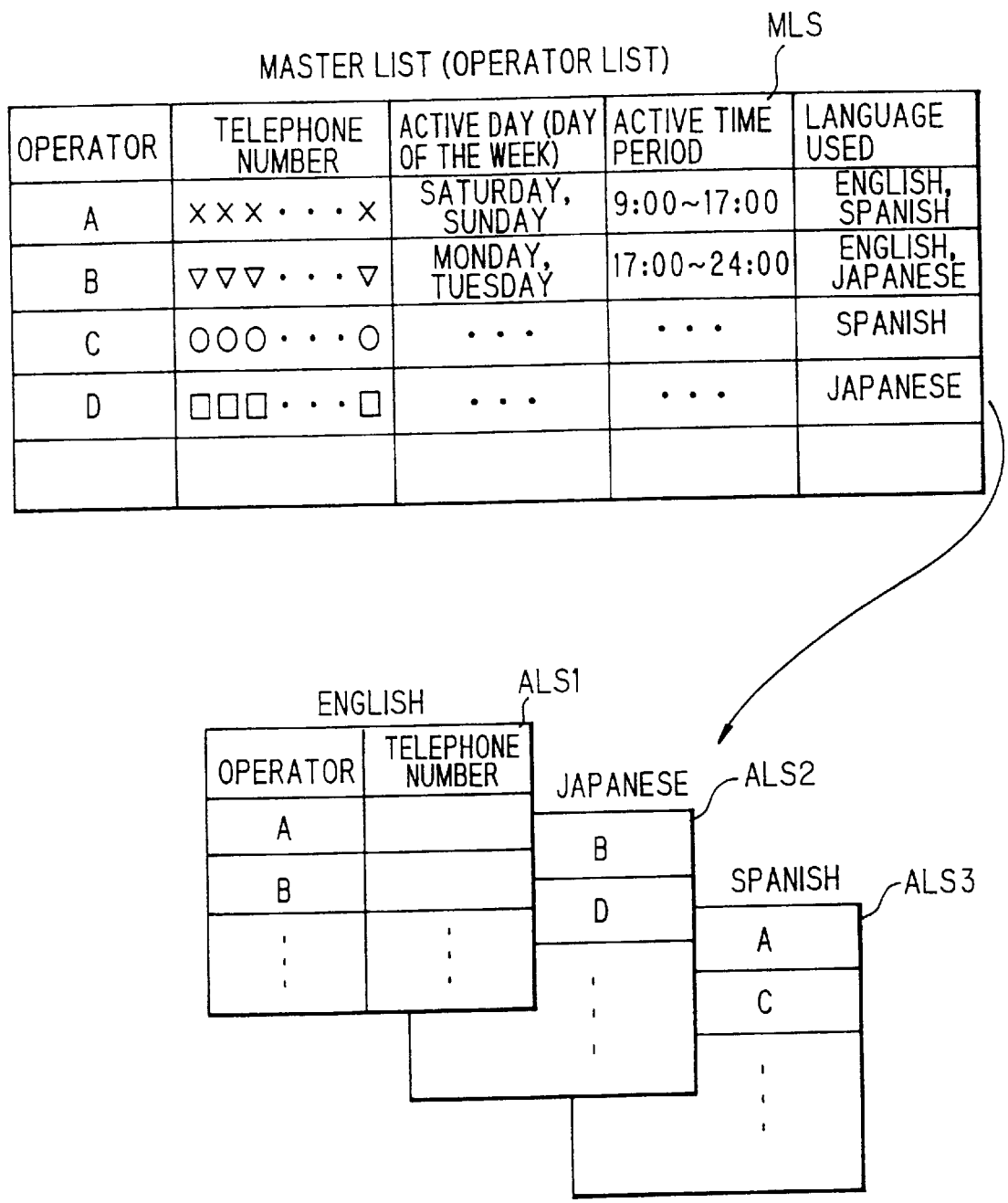
FIG. 21 is a diagram for describing active lists classified by language.

Further, on the basis of the languages used by the operator terminals registered in the master list MLS, active lists ALS1, ALS2, ALS3, . . . of operator terminals classified by the language used (English, Japanese, Spanish, . . . ) are created in advance, as shown in FIG. 21. In a case where such active lists exist, the terminal management unit 4 obtains an active list conforming to the language desired by the caller at step 326 in FIG. 20, periodically calls the operator terminals that have been registered in this active list and, when an operator terminal responds, calls the caller and connects the caller to this operator terminal.

(n) Call-busy service processing taking default language into account

Figure 22:
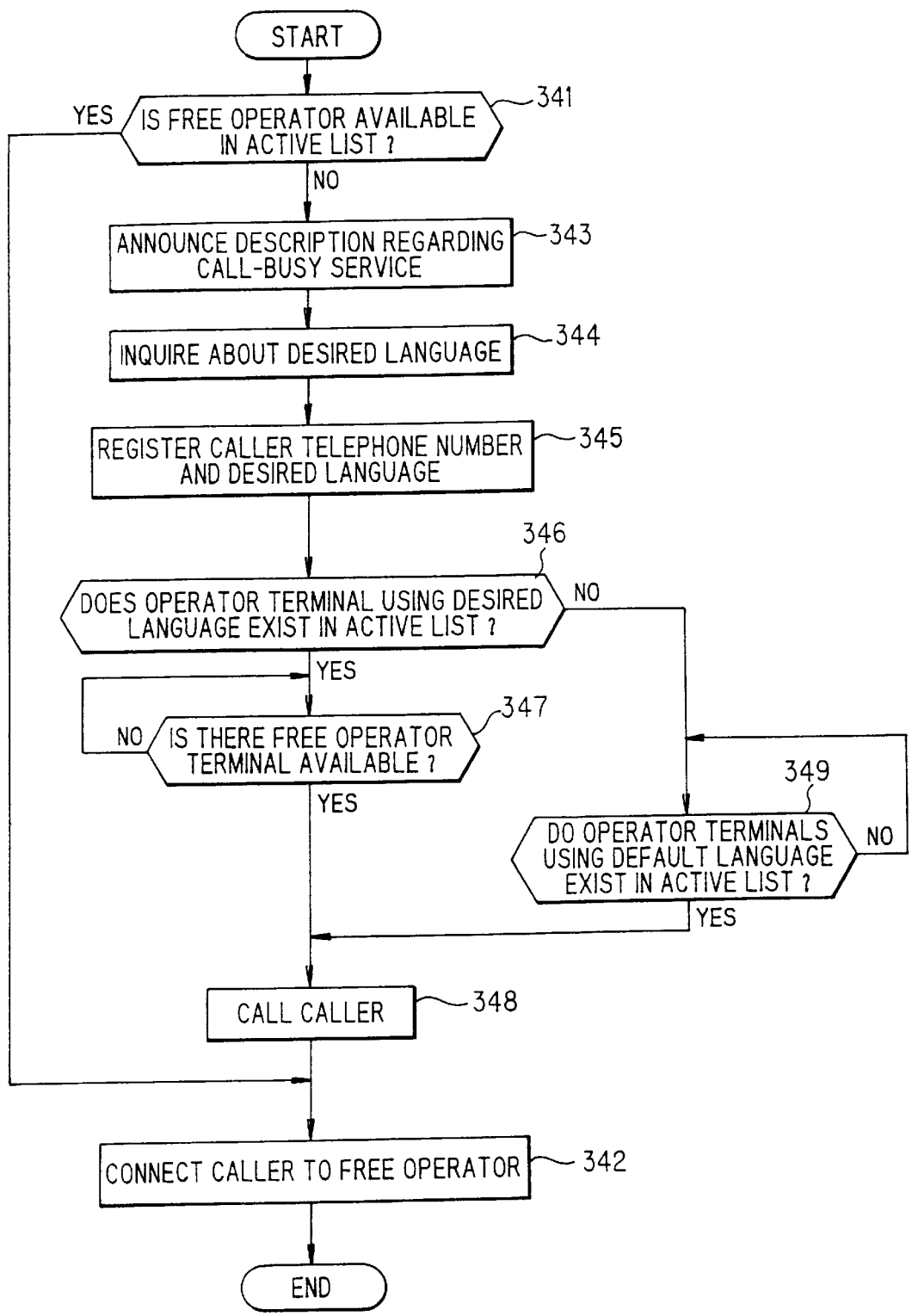
FIG. 22 is a flowchart of processing for a call-busy service that takes a default language into account.

The foregoing is for a case where the caller is connected to an operator terminal whose language is that desired by the caller. However, if the language desired by the caller is a special language and an operator who uses this language is not available, it will not be possible to connect the caller to any operator. Accordingly, an arrangement is adopted in which a default language (assumed here to be English) is set in advance. Then, if an operator whose language is that desired by the caller is not available, the operator is connected to an operator who uses the default language (English). FIG. 22 is a flowchart of the call-busy service processing in such case.

If the communication apparatus is busy, the terminal management unit 4 determines whether the active list ALS contains a free operator terminal (step 341). In other words, the terminal management unit 4 successively calls, at predetermined time intervals in the order in which they were registered, the operator terminals that have been registered in the active list ALS and determines whether an operator terminal has responded. If any operator terminal responds, then the terminal management unit 4 connects the caller to this operator terminal and ends connection processing (step 342).

If none of the operator terminals that have been registered in the active list respond, then the terminal management unit 4 connects the caller to the announcement unit to describe the call-busy service (step 343) and instructs the caller to enter the desired language and to disconnect the call (step 344). If the caller disconnects the call after entering the desired language, the terminal management unit 4 enters the telephone number of the caller at the end of the calling-side registration list CLS along with the desired language (step 345).

The terminal management unit 4 thenceforth refers to the active list ALS and master list MLS to determine whether operator terminals for which the language is the language desired by the caller at the top of the calling-side registration list CLS are present (step 346). If such operator terminals are present, the terminal management unit 4 determines whether these operator terminals include a free operator terminal (step 347). In other words, the terminal management unit 4 successively calls, at predetermined time intervals, the operator terminals found at step 346 and determines when an operator terminal has responded. If any operator terminal responds, the terminal management unit 4 calls the caller (step 348), connects the caller to this operator terminal (step 342) and ends connection processing.

If an operator terminal whose language is that desired by the caller is not found at step 346, the terminal management unit 4 determines whether operator terminals having English as the default language are contained in the active list (step 349). If such operator terminals exist, it is determined whether these operator terminals include a free operator terminal (step 348). More specifically, the terminal management unit 4 successively calls, at predetermined time intervals, the operator terminals found at step 349 and determines when an operator terminal has responded. If any operator terminal responds, the terminal management unit 4 calls the caller (step 348), connects the caller to this operator terminal (step 342) and ends connection processing.

If this arrangement is adopted, an operator whose language is that desired by the caller can be connected to the caller. Moreover, if the language desired by the caller is a special language and an operator terminal that uses this language does not exist, the caller can be connected to an operator whose language is a default language (e.g., English).

(o) Processing for giving notification of average call-back time

If a caller could be notified of average waiting time necessary to connect the caller to an operator terminal, this would be convenient because then the caller would know how long to wait for call-back.

Figure 23:
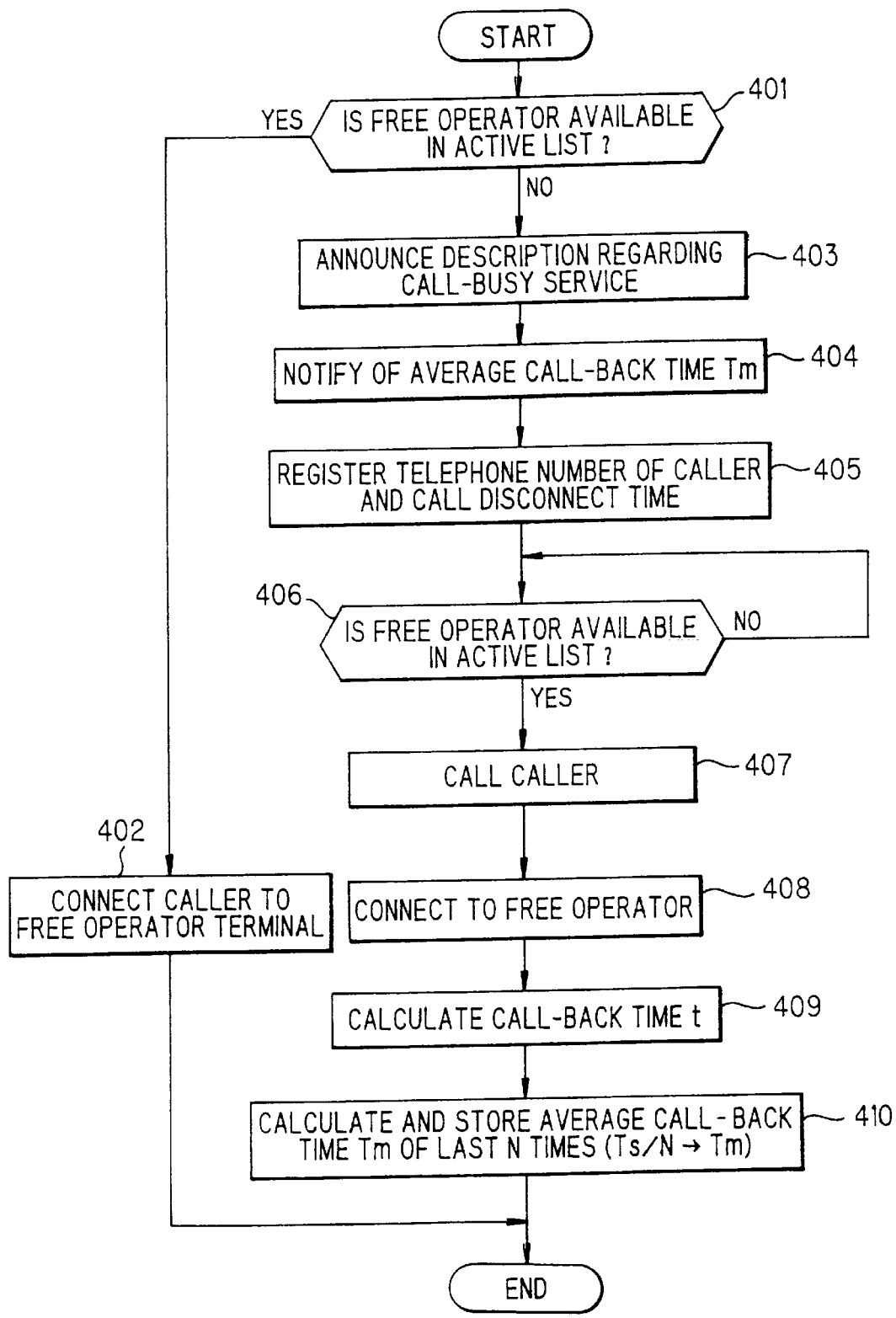
FIG. 23 is a flowchart of call-busy service processing that includes processing for notifying a caller of average waiting time until call-back.

FIG. 23 is a flowchart of call-busy service processing that includes processing for notifying a caller of average waiting time until call-back.

If the communication apparatus is busy, the terminal management unit 4 determines whether the active list ALS contains a free operator terminal (step 401). In other words, the terminal management unit 4 successively calls, at predetermined time intervals in the order in which they were registered, the operator terminals that have been registered in the active list ALS and determines whether an operator terminal has responded. If any operator terminal responds, then the terminal management unit 4 connects the caller to this operator terminal and ends connection processing (step 402).

If none of the operator terminals that have been registered in the active list respond, then the terminal management unit 4 connects the caller to the announcement unit to describe the call-busy service (step 403), notifies the caller of already calculated average time Tm required for call-back and instructs the caller to disconnect the call (step 404). If the caller disconnects the call after entering the desired language, the terminal management unit 4 enters the telephone number of the caller at the end of the calling-side registration list CLS along with the time at which the caller disconnected the call (step 405).

The terminal management unit 4 then successively calls, at predetermined time intervals in the order in which they were registered, the operator terminals that have been registered in the active list ALS and determines whether an operator terminal has responded (step 406). If any operator terminal responds, then the terminal management unit 4 calls the caller registered at the top of the calling-side registration list CLS (step 407) and connects this caller to the operator terminal (step 408).

Next, the terminal management unit 4 calculates, as call-back time t, the difference between the present time and the time at which the caller disconnected the call (step 409), calculates average call-back time Tm calculated over the last N times, stores the value of Tm (step 410) and then ends connection processing.

Figure 24A:
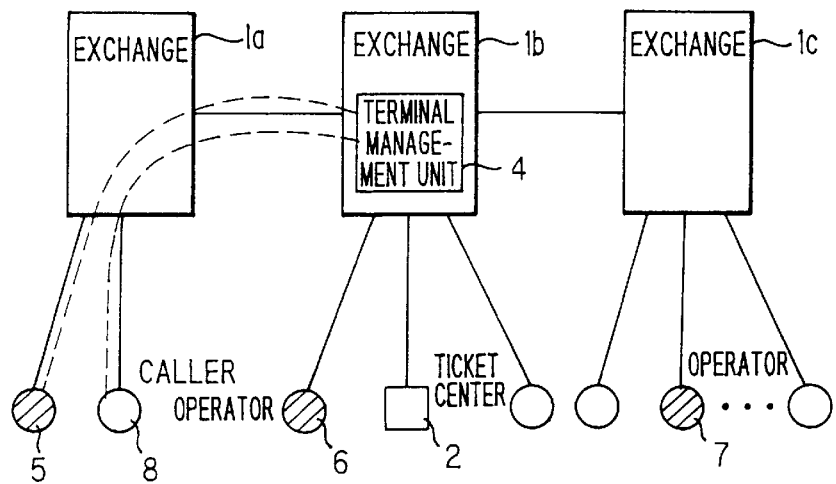
FIGS. 24A, 24B and 24C are diagrams for describing connection to an operator in a case where an exchange is provided with a terminal management unit.
Figure 24B:
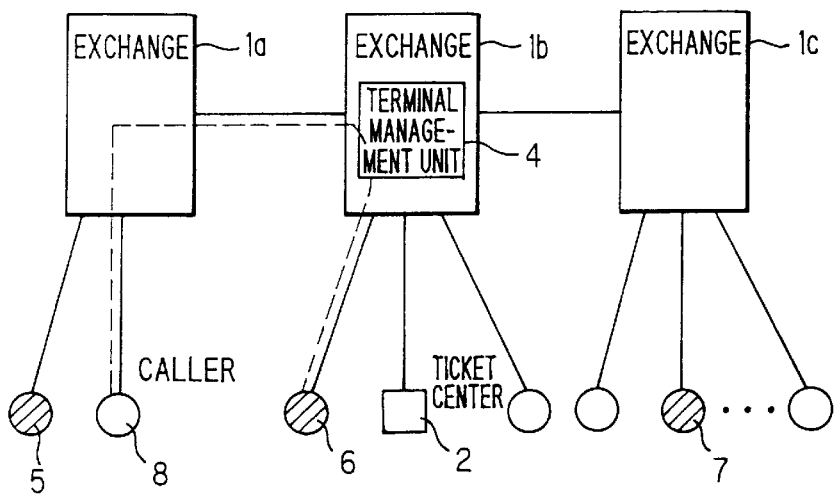
Figure 24C:
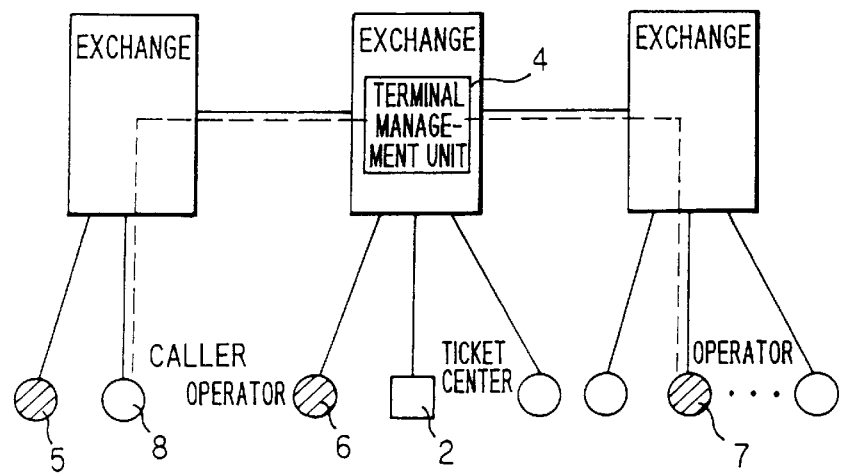

(p) Example of system configuration when terminal management use is provided in exchange FIGS. 24A, 24B and 24C are diagrams for describing connection to an operator in a case where a system is constructed by providing a single exchange with a terminal management unit and connecting operator terminals to a variety of exchanges. Shown in FIGS. 24A, 24B and 24C are exchanges 1a~1c, the communication apparatus 2, which is a ticket sales enter, the terminal management unit 4, which is provided in the exchange 1b, the operator terminals 5~7 and the caller 8. Three scenarios are conceivable in this system, namely (1) a scenario in which, as shown in FIG. 24A, the caller 8 is connected to the operator terminal 5 of the exchange 1a that accommodates the caller 8, (2) a scenario in which, as shown in FIG. 24B, the caller 8 is connected to the operator terminal 6 of the exchange 1b that accommodates the communication apparatus 2, and (3) a scenario in which, as shown in FIG. 24C, the caller 8 is connected to the operator terminal 7 of the other exchange 1c.

Figure 25A:
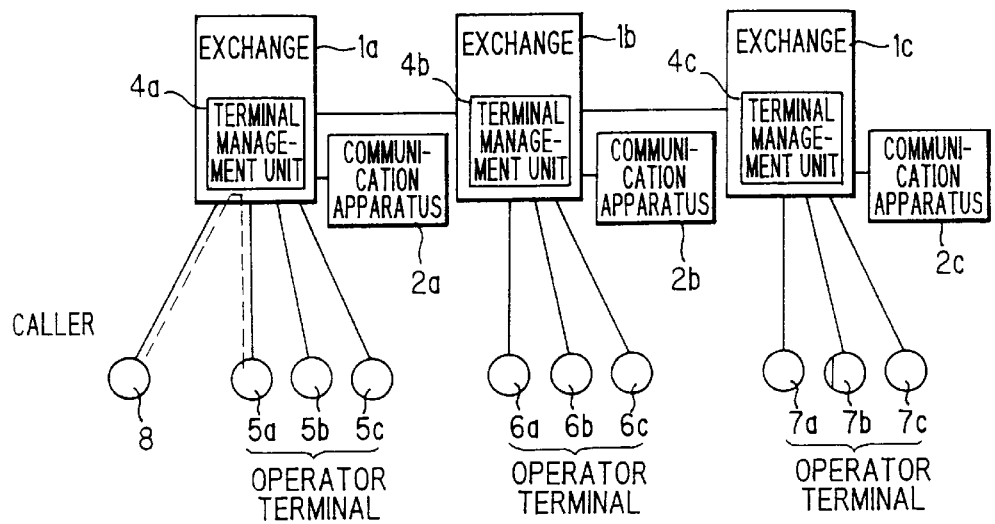
FIGS. 25A, 25B and 25C are diagrams for describing connection to an operator in a case where each of a plurality of exchanges is provided with a terminal management unit.
Figure 25B:
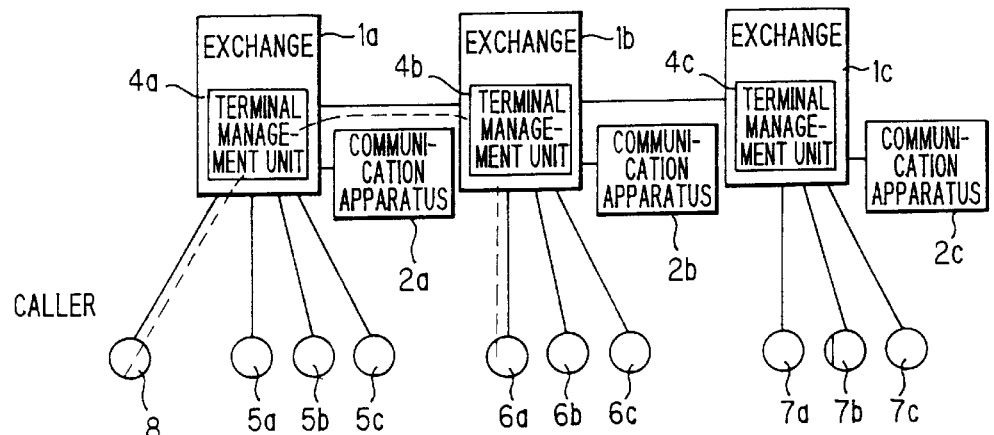
Figure 25C:
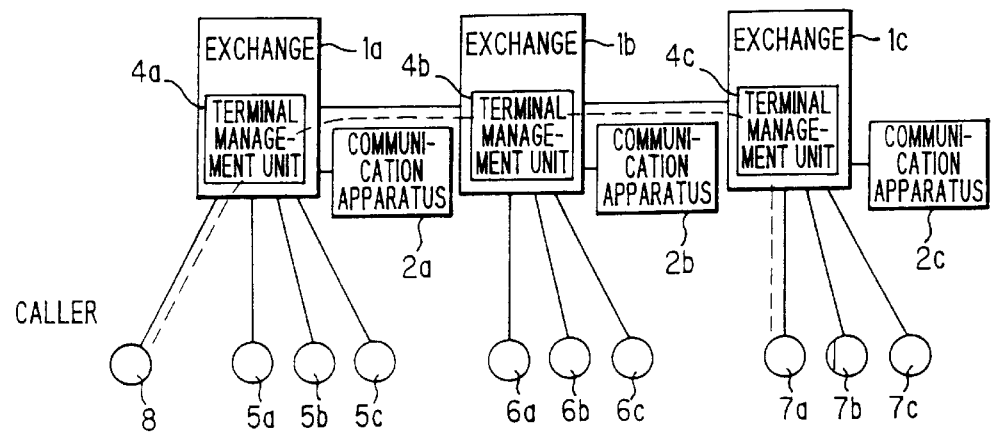

FIGS. 25A~25C are diagrams showing another system according to the present invention. Here each exchange is provided with a terminal management unit and each terminal management unit performs operator connection control when the communication apparatus under its supervision is busy. Shown in FIGS. 25A, 25B and 25C are exchanges 1a~1c, communication apparatus 2a~2c connected to respective exchanges, terminal management units 4a~4c provided in respective exchanges, operator terminals 5a~5c, 6a~6c and 7a~7c connected to the exchanges 1a, 1b and 1c, respectively, and the caller 8.

FIG. 25A shows a scenario in which the communication apparatus 2a, which is connected to the exchange 1a, is busy when the caller 8 calls the communication apparatus 2a. In this case the terminal management unit 4a within the exchange 1a performs operator connection control to connect the caller 8 to the operator terminal 5a, by way of example.

FIG. 25B shows a scenario in which the communication apparatus 2b, which is connected to the exchange 1b, is busy when the caller 8 calls the communication apparatus 2b. In this case the terminal management unit 4b within the exchange 1b performs operator connection control to connect the caller 8 to the operator terminal 6a, by way of example.

FIG. 25C shows a scenario in which the communication apparatus 2c, which is connected to the exchange 1c, is busy when the caller 8 calls the communication apparatus 2c. In this case the terminal management unit 4c within the exchange 1c performs operator connection control to connect the caller 8 to the operator terminal 7a, by way of example.

Figure 26:
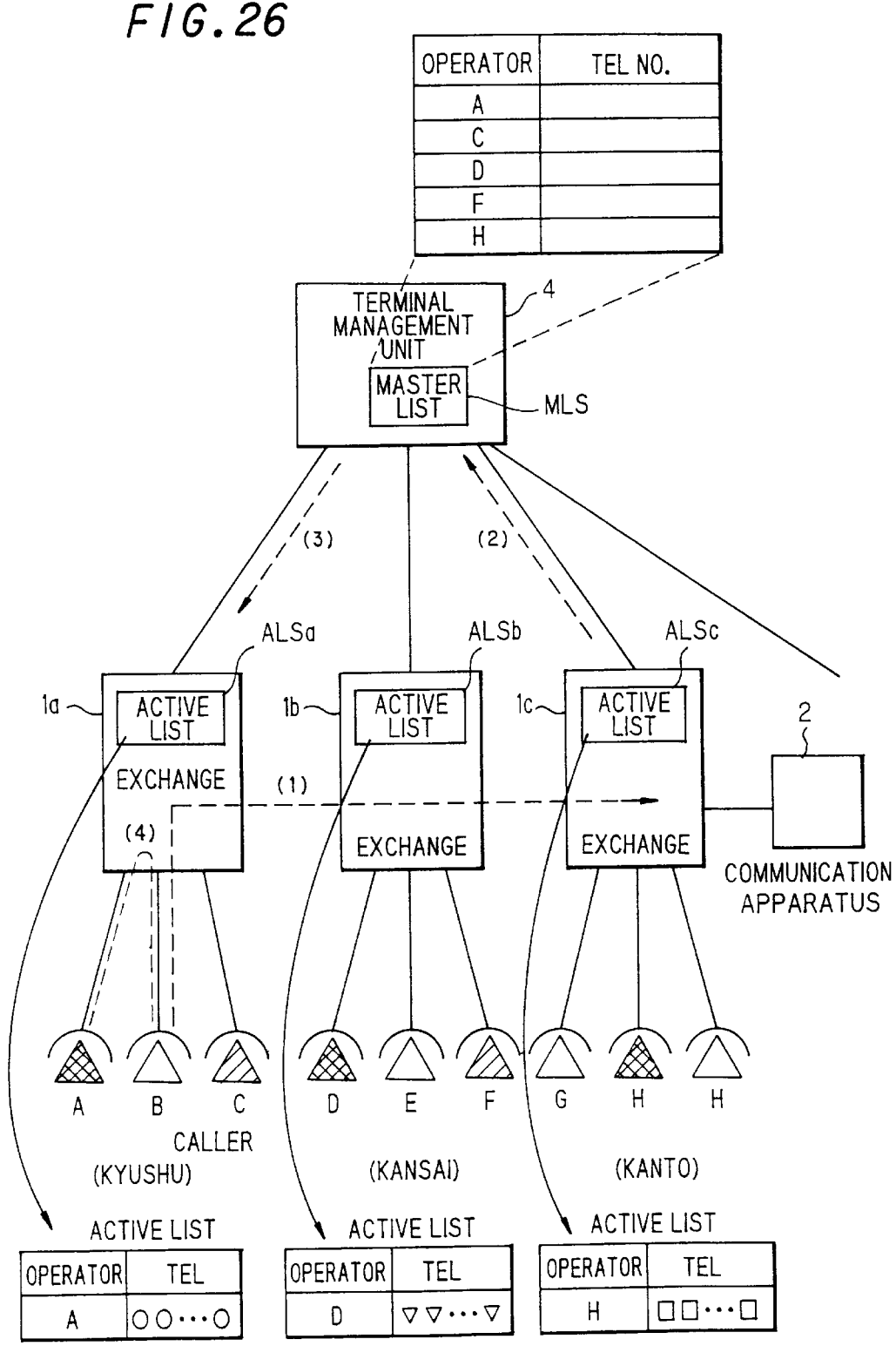
FIG. 26 is a diagram for describing a system in which active lists are decentralized.

FIG. 26 is a diagram showing the configuration of a system in a case where active lists ALS are dispersed among a plurality of exchanges in a network. Shown in FIG. 26 are the exchange 1a, which is for the Kyushu area, the exchange 1b, which is for the Kansai area, and the exchange 1c, which is for the Kanto area, as well as the communication apparatus 2, which is provided at a ticket vending center and connected to the exchange 1c for the Kanto area. Further, the terminal management unit 4 is provided in any exchange within the network. Further, characters A, C represent operator terminals for the Kyushu area accommodated by the exchange 1a, D, F operator terminals for the Kansai area accommodated by the exchange 1b, and H an operator terminal for the Kanto area accommodated by the exchange 1c. Among these operator terminals, the operator terminals A, D, H are active. The terminal management unit 4 is equipped with the master list MLS, and the exchanges 1a, 1b, 1c for the various areas are equipped with active lists ALSa, ALSb, ALSc, respectively, for registering the active operator terminals for the respective areas.

The registration of operator terminals in the master list MLS is performed by having each operator terminal access the terminal management unit 4 directly. Similarly, the registration of operator terminals in the active lists is performed by having each operator terminal access the terminal management unit 4 directly. In this case, however, after the terminal management unit 4 accepts an "active" registration request from an operator terminal, the terminal management unit 4 transmits the terminal number of the operator terminal registered as being active to the exchange in the area to which this operator terminal belongs and registers this operator terminal number in the active list (ALSa, ALSb or ALSc) of this exchange.

Under these conditions, (1) a caller B calls the ticket center. (2) If the communication apparatus 2 of the ticket center is busy, then the exchange 1c accommodating this communication apparatus notifies the terminal management unit 4 of the fact that the communication apparatus is busy and also notifies the terminal management unit 4 of the telephone number of the caller. (3) On the basis of the notification given, the terminal management unit 4 instructs the exchange 1a of the area to which the caller belongs to execute call-back control. (4) The exchange 1a refers to its own active list ALSa, performs call-back control through the method described above and connects the caller B to the operator terminal A. If this arrangement is adopted, a caller is connected to an operator terminal in the area to which the caller belongs even if the ticket center is located a great distance from the caller. This makes it possible to reduce the telephone bill.

The foregoing is for a case where the terminal management unit is provided in an exchange. However, it is possible also to provide the terminal management unit at the service control point SCP (see FIG. 3B) in the intelligent network. An intelligent network is a network whose purpose is to separate service-related functions from an exchange and control services in centralized fashion. Accordingly, the terminal management function, which is one of the service-related functions, is separated from the exchange and given to the service control point SCP where the call-busy service control (operator connection control) is executed. If this arrangement is adopted, the exchange need not control the call-busy service and need only execute ordinary call processing. Further, in a case where a plurality of exchanges in a network possess the terminal management function, as shown in FIG. 25, processing for modifying the software of all of the exchanges must be carried out if it becomes necessary to modify the software of the terminal management function. However, if terminal management is carried out in centralized fashion at the service control point SCP, it will suffice to modify the software of the terminal management function of the service center. In addition, since the database also is managed en bloc, control for retrieving operator terminals and connecting callers to the operator terminals also can be performed efficiently.

Figure 27:
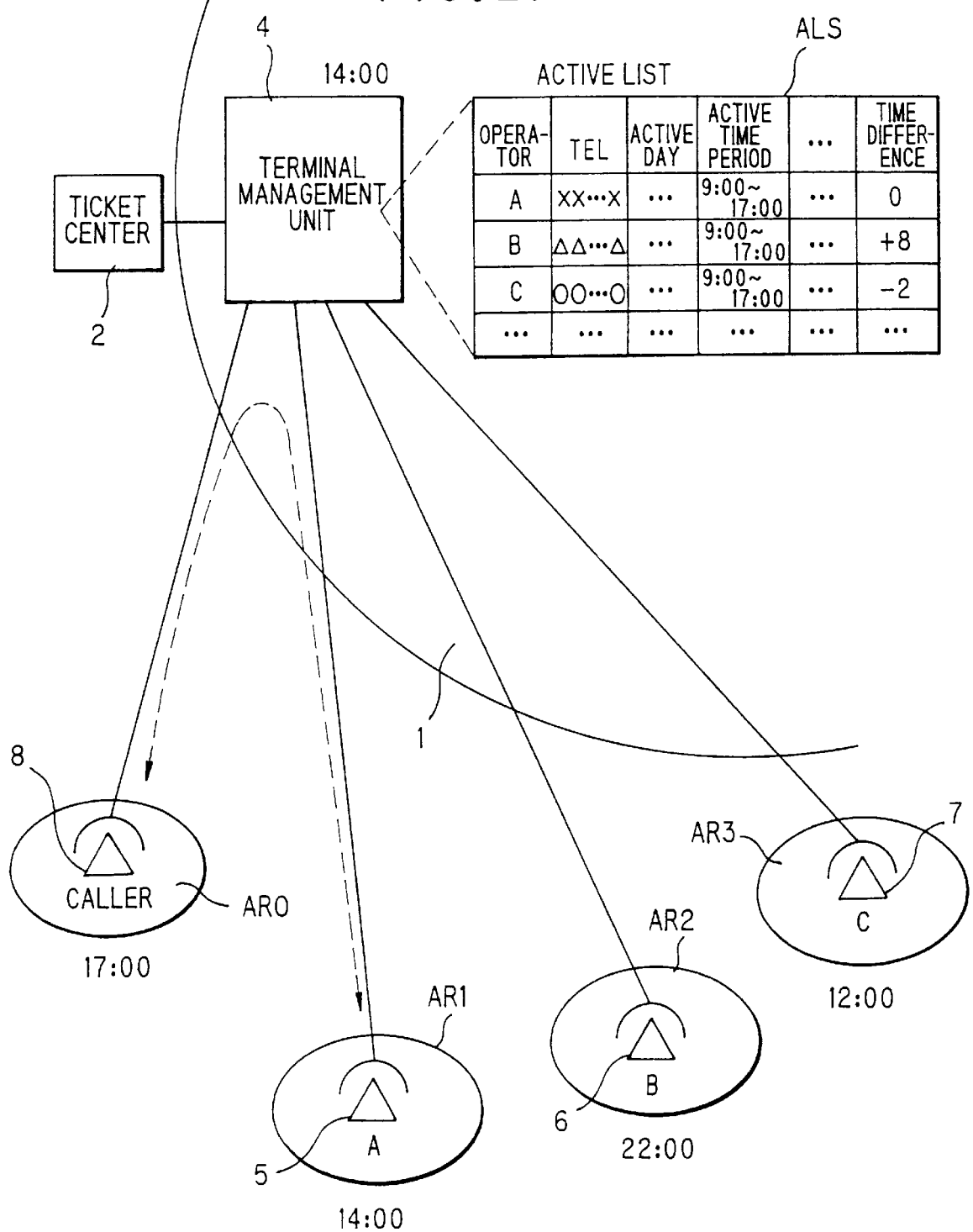
FIG. 27 is a diagram for describing a case where operator terminals are located in areas for which there is a time difference.

(q) When operator terminals are located in areas for which there is a time difference (q-1) Overview FIG. 27 is a diagram for describing a case where operator terminals are located in areas for which there is a time difference.

In a scenario wherein the operator terminals 5~7 connected to the network 1 are dispersed in areas AR1~AR3 for which there is a time difference relative to the location at which the terminal management unit 4 is located, the time differences between the area in which the terminal management unit 4 is located and the areas in which the operator terminals 5~7 are located are registered in the active list ALS of terminal management unit in advance. The terminal management unit 4 obtains operator terminals, which are in an active time period, upon taking into account the time differences involving the operator terminals registered in the active list ALS, and periodically calls these operator terminals. When an operator terminal responds, the terminal management unit 4 connects the caller to this operator terminal. This expedient makes it possible to shorten operator connection time because it is unnecessary to call an operator that is not currently active. Moreover, the caller can be connected reliably to an operator terminal that is currently active.

(q-2) Call-busy service processing taking time difference into account

Figure 28:
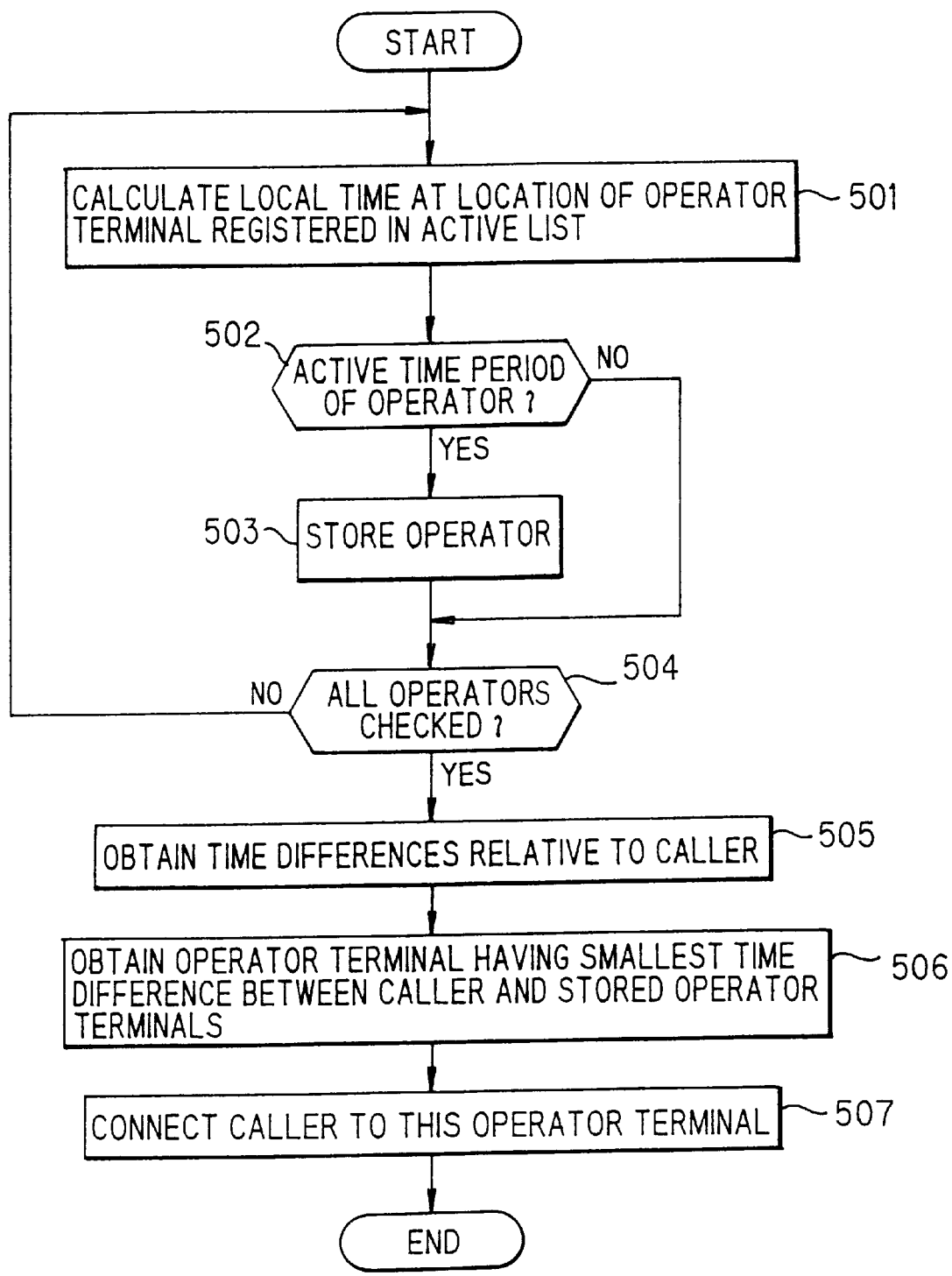
FIG. 28 is a flowchart of processing for a call-busy service that takes time difference into account.
Figure 29:
FIG. 29 is a diagram for describing conversion of active time periods.

FIG. 28 is a flowchart of processing for a call-busy service that takes a time difference between a caller and an operator terminal into account.

In processing for calling back a caller, the terminal management unit 4 uses the present time and the time difference to calculate the local time at the location of each operator terminal that has been registered in the active list ALS (step 501) and determines whether the local time falls into the active time period of an operator terminal (step 502). If it does, then the terminal management unit 4 stores this operator terminal (step 503). The terminal management unit 4 subsequently determines whether the above-described processing has been executed with regard to all operator terminals on the active list (step 504). If processing has not been finished for all operator terminals, the terminal management unit 4 repeats processing from step 501 onward.

If retrieval of all active operator terminals is finished, the terminal management unit 4 obtains the time difference between the area of each operator terminal retrieved and the area in which the caller is located (step 505). In other words, the terminal management unit 4 obtains the area of the caller from the telephone number of the caller and obtains the difference between the area of the caller and the area in which the terminal management unit is located. Next, using this time difference and the time difference involving each operator terminal registered in the active list, the terminal management unit 4 obtains the time differences between the area of the caller and the areas in which the operator terminals are located. The terminal management unit 4 then obtains the operator terminal for which the time difference is smallest (step 506), calls this operator terminal and, if the operator terminal answers, calls the caller and connects the caller to this operator terminal (step 507).

The arrangement described above is such that the operator terminal for which the time difference is smallest is obtained at step 506 and the caller is connected to this operator terminal. However, step 506 can be deleted and an operator terminal in the active time period can merely be connected to the caller.

(q-3) Modification 1

An arrangement can be adopted in which, on the basis of the time differences between the area in which the terminal management unit is located and the areas in which the operator terminals 5~7 are located, the terminal management unit 4 converts the active time periods of these operator terminals to time periods that prevail in the area in which the terminal management unit 4 is located, registers the time periods resulting from the conversion in an active list ALS' together with the telephone numbers of the operator terminals 5~7 and executes processing for operator connection control using the active list ALS'. More specifically, in processing for calling back the caller, the terminal management unit 4 goes to the active list ALS' to find an operator terminal for which the current date and time is the date and time at which the operator terminal is active, call this operator terminal back and connects the caller to this operator terminal. This makes it possible to execute call-back processing in a shorter period of time.

(q-4) Modification 2

The foregoing relates to a case where a network is provided with one terminal management unit. However, it is also possible to construct a call-busy service system by dispersing the terminal management units 4a~4c in the areas AR1~AR3 with respect to which there are time differences and providing a central management station 9 for centralized administration of these terminal management units.

If an operator terminal capable of terminating a call does not exist in the area AR1 to which the caller 8 belongs, the terminal management unit 4a requests the central management station 9 to connect the caller to an operator terminal in another area and transmits the telephone number, the current time, the desired language and the area data, etc., of the caller.

As a result, the central management station 9 refers to a call-back management list CBL, which has been registered in advance, obtains the terminal management unit 4c of area AR3, for which the time difference relative to the area AR1 of the caller is smallest, from among terminal management units in the active time period, and instructs the terminal management unit 4c to connect the caller to this operator terminal.

Upon being so instructed, the terminal management unit 4c refers to the active list under its own supervision, obtains the connectable operator terminal 7 and connects the caller to the operator terminal 7.

This arrangement is such that if the area to which the caller belongs does not include an operator terminal which is capable of terminating an incoming call, the caller can be connected to an operator terminal which is capable of responding and is closest to the caller in terms of the time difference.

Thus, in accordance with the present invention, it is so arranged that when a communication apparatus is busy with respect to incoming calls, a caller can be called back and connected to an operator terminal by control on the network side if the caller discontinues the call. This makes it unnecessary for the caller to make calls repeatedly.

In accordance with the present invention, it is so arranged that a terminal in one's home can be registered and utilized as an operator terminal. This makes it possible to lengthen call reception time and increase the number of operator terminals and, as a consequence, to reduce situations in which calls become concentrated or cannot be readily connected.

In accordance with the present invention, a master list for registering all operator terminals and an active list for registering only operator terminals that are capable of responding are provided, and operator connection control is carried out by relying solely upon the operator terminals that have been stored in the active list. As a result, time is not wasted by calling operator terminals that would be incapable of responding when they are called. This makes it possible to shorten operator connection time.

In accordance with the present invention, it is arranged to perform operator connection control by registering dates on which a response is possible and lengths of time during which a response is possible in correspondence with operator terminals, whereby only operator terminals capable of responding at the current date and time are dealt with in the control operation. This makes it possible perform operator connection control efficiently and in a short period of time.

In accordance with the present invention, it is so arranged that an operator terminal capable of responding in a language desired by the caller can be connected to the caller by registering the languages used by operators so as to correspond to the operator terminals.

In accordance with the present invention, it is so arranged that a caller can be connected to an operator terminal by taking into account the time periods during which registered operator terminals are active, as well as the local time differences, in a case where the operator terminals are located in areas for which there is a time difference relative to the location of the caller.

In accordance with the present invention, average time needed for an operator terminal to be connected to a caller is calculated at all times and, when an incoming call cannot be connected because the system is busy, the caller is notified of the average waiting time. This makes it possible to improve the quality of service provided to users.

As many apparently widely different embodiments of the present invention can be made without departing from the spirit and scope thereof, it is to be understood that the invention is not limited to the specific embodiments thereof except as defined in the appended claims.

What is claimed is:

1. An operator connection control method in a communication system including a communication apparatus and a plurality of operator terminals under the control of the communication apparatus wherein the communication apparatus connects a caller to one of the operator terminals at the time of an incoming call and allowing an operator to make a prescribed response to the caller using the operator terminal, comprising the steps of:

internally providing a network with a terminal management unit for executing operator connection control when the communication apparatus is busy;

pre-registering, in the terminal management unit, a list of communication apparatuses capable of receiving call-busy service and a list of external operator terminals used by external operators, these terminals being connected to the network externally of the communication apparatus;

determining whether a communication apparatus is busy when there is an incoming call to the communication apparatus and whether the communication apparatus has been registered in the list as an apparatus capable of receiving the call-busy service;

storing, by the terminal management unit, a telephone number of a caller in a case where the communication apparatus is busy and the communication apparatus has been registered in the list; and subsequently having the terminal management unit call the external operator terminals periodically and, when an external operator terminal responds, call the caller and connect the caller to this external operator terminal.

2. The method according to claim 1, further comprising the steps of:

calculating, by said terminal management unit, average time needed to connect a caller to an external operator terminal from the moment the caller discontinues a call; and notifying the caller of the average time by said terminal management unit.

3. The method according to claim 1, wherein said terminal management unit has a master list for registering the external operator terminals and an active list for registering external operator terminals which, from among the external operator terminals that have been registered in the master list, are capable of actually responding to a caller;

said terminal management unit periodically calling the external operator terminals that have been registered in the active list and, when an external operator terminal responds, calling the caller and connecting the caller to this external operator terminal.

4. The method according to claim 3, further comprising the steps of:

dispersing active lists to a plurality of exchanges in a network;

calling an external operator terminal, which has been registered in an active list, by an exchange on the basis of a command from the terminal management unit; and when an external operator terminal responds, calling the caller and connecting the caller to this external operator terminal.

5. The method according to claim 3, further comprising the steps of directly accessing the terminal management unit from an external operator terminal and registering this external operator terminal in the active list as an active external operator terminal or deleting this external operator terminal from the active list.

6. The method according to claim 3, further comprising the steps of:

simultaneously registering, in the master list, dates and times at which external operators are active when external terminals are registered in said master list as external operator terminals; and periodically calling active external operator terminals for which the current date and time are included as the active date and time and, when an external operator terminal responds, calling the caller and connecting the caller to this external operator terminal.

7. The method according to claim 6, further comprising the steps of:

registering time differences between an area in which the terminal management unit is located and areas in which the external operator terminals are located in the terminal management unit in a case where the external operator terminals are connected to the network in dispersed fashion in areas for which there is a time difference relative to the area in which the terminal management unit is located;

obtaining, by said terminal management unit, external operator terminals in an active time period from among the external operator terminals registered in the active list upon taking time difference into account; and periodically calling these external operator terminals by said terminal management unit and, when an external operator terminal responds, calling the caller and connecting the caller to this external operator terminal.

8. The method according to claim 7, further comprising the steps of:

obtaining an external operator terminal in an area for which the time difference relative to the location of the caller is smallest; and calling this external operator terminal and, when the external operator terminal responds, calling the caller and connecting the caller to this external operator terminal.

9. The method according to claim 6, further comprising the steps of:

converting active time periods of external operator terminals to time periods that prevail in the area in which the terminal management unit is located based upon time differences between the area in which the terminal management unit is located and areas in which the external operator terminals are located;

registering the time periods resulting from the conversion in the active list together with telephone numbers of the external operator terminals;

obtaining, from the active list by said terminal management unit, active external operator terminals for which the current date and time fall within an active time period of the external operator terminals; and periodically calling these external operator terminals and, when an external operator terminal responds, calling the caller and connecting the caller to this external operator terminal.

10. The method according to claim 3, further comprising the steps of:

registering languages, which are used by operators of the external operator terminals, in the master list at the same time that external terminals are registered in said master list as the external operator terminals; and obtaining external operator terminals, whose languages are desired by a caller, from the active list, periodically calling these external operator terminals and, when an external operator terminal responds, calling the caller and connecting the caller to this external operator terminal.

11. The method according to claim 10, further comprising the steps of:

creating, on the basis of languages used by external operator terminals that have been registered in the master list, active lists classified by the languages used;

periodically calling external operator terminals that have been registered in an active list conforming to a language desired by a caller; and when an external operator terminal responds, calling the caller and connecting the caller to this external operator terminal.

12. The method according to claim 3, further comprising the steps of:
   obtaining external operator terminals that satisfy a preset condition from the active list if external operator terminals that satisfy a condition specified by a caller do not exist in the active list; and
   periodically calling these external operator terminals and, when an external operator terminal responds, calling the caller and connecting the caller to this external operator terminal.

13. The method according to claim 3, wherein said terminal management unit calls external operator terminals in the order in which they were registered in the active list and connects a caller to whichever external operator terminal responds first.

14. The method according to claim 13, wherein when said terminal management unit is calling a certain external operator terminal and this external operator terminal is busy for a period of time that exceeds a set period of time, the terminal management unit shifts this external operator terminal to the bottom of the active list.

15. The method according to claim 13, wherein if length of time an external operator terminal is being called exceeds a fixed length of time without this external operator terminal responding or with this external operator terminal remaining busy, the next external operator terminal is called.

16. The method according to claim 3, wherein if an external operator terminal does not respond even when said terminal management unit has called the external operator terminal, which has been registered in the active list, in excess of a set number of times or even when total length of calling time is greater than a set length of time, said terminal management unit automatically deletes this external operator terminal from the active list.

17. The method according to claim 3, further comprising the steps of:
   dispersing terminal management units in areas having time difference relative to one another and providing a central management station for centrally managing these terminal management units,
   if an external operator terminal capable of terminating a call does not exist in the area to which the caller belongs, having said central management station obtain a terminal management unit in an area for which the time difference is smallest relative to the area to which the caller belongs and instruct this terminal management unit to connect the caller to an external operator terminal; and
   having the instructed terminal management unit obtain a connectable external operator terminal by referring to the active list and connect the caller to this external operator terminal.

18. The method according to claim 3, further comprising the step of providing the terminal management unit at a service control point of an intelligent network or at a service switching point of an exchange.

19. The method according to claim 1, further comprising the step of directly accessing the terminal management unit from an external terminal and registering this external terminal in the master list as an external operator terminal or deleting this external terminal from the master list.

20. The method according to claim 1, further comprising the steps of:
   successively calling external operator terminals by said terminal management unit if the communication apparatus is busy when an incoming call from a caller arrives at the communication apparatus; and
   if no external operator terminal responds even when length of calling time exceeds a set time or when number of calls made exceeds a set number, registering a telephone number of the caller in a registration list on the originating side after the caller has discontinued the call.

21. The method according to claim 20, further comprising the steps of:
   periodically calling external operator terminals by said terminal management unit after the telephone numbers of callers have been registered in the registration list on the originating side;
   when an external operator terminal has responded, calling the callers in the order in which they were registered in the registration list on the originating side; and
   if a caller fails to respond within a fixed period of time, shifting this caller to the bottom of the registration list on the originating side and calling the next caller.

22. An operator connection control system including a communication apparatus connected to a network and a plurality of operator terminals used by a plurality of external operators under control of the communication apparatus, the communication apparatus connecting a caller to one of the operator terminals at the time of an incoming call and allowing an operator to make a prescribed response to the caller using the operator terminal comprising:
   a plurality of communication apparatus connected to the network;
   a terminal management unit provided in the network for executing operator connection control when a communication apparatus capable of receiving call-busy service is busy; and
   external operator terminals used by external operators for each communication apparatus, these terminals being connected to the network externally of the communication apparatus, wherein
   the terminal management unit including:
      means for pre-registering a list of communication apparatuses capable of receiving call-busy service and a list of external operator terminals used by external operators;
      means for determining whether a communication apparatus is busy when there is an incoming call to the communication apparatus and whether the communication apparatus has been registered in the list as an apparatus of receiving the call-busy service; and
      means for storing a telephone number of a caller in a case where the communication apparatus is busy and the communication apparatus has been registered in the list, and for subsequently calling the external operator terminals periodically and, when an external operator terminal responds, for calling the caller and connecting the caller to said responding external operator terminal.

23. The system as in claim 22, further comprising:
   means for calculating, by said terminal management unit, average time needed to connect a caller to an external operator terminal from the moment the caller discontinues a call; and for notifying the caller of the average time by said terminal management unit.

24. The system according to claim 22, wherein said terminal management unit has a master list for registering the external operator terminals and an active list for registering external operator terminals which, from among the external operator terminals that have been registered in the master list, are capable of actually responding to a caller;

said terminal management unit periodically calling the external operator terminals that have been registered in the active list and, when an external operator terminal responds, calling the caller and connecting the caller to this external operator terminal.

25. The system according to claim 22, further comprising means for directly accessing the terminal management unit from an external terminal and registering this external terminal in the master list as an external operator terminal or deleting this external terminal from the master list.

26. The system according to claim 24, further comprising:

means for dispersing active lists to a plurality of exchanges in a network;

means for calling an external operator terminal, which has been registered in an active list, by an exchange on the basis of a command from the terminal management unit.

27. The system according to claim 24, further comprising means for directly accessing the terminal management unit from an external operator terminal and registering this external operator terminal in the active list as an active external operator terminal or deleting this external operator terminal from the active list.

28. The system according to claim 24, further comprising:

means for simultaneously registering, in the master list, dates and times at which external operators are active when external terminals are registered in said master list as external operator terminals; and for periodically calling active external operator terminals for which the current date and time are included as the active date and time and, when an external operator terminal responds, calling the caller and connecting the caller to this external operator terminal.

29. The system according to claim 24, further comprising:

means for registering languages, which are used by operators of the external operator terminals, in the master list at the same time that external terminals are registered in said master list as the external operator terminals; and for obtaining external operator terminals, whose languages are desired by a caller, from the active list, periodically calling these external operator terminals and, when an external operator terminal responds, calling the caller and connecting the caller to this external operator terminal.

30. The system according to claim 24, further comprising:

means for obtaining external operator terminals that satisfy a preset condition from the active list if external operator terminals that satisfy a condition specified by a caller do not exist in the active list; and for periodically calling these external operator terminals and, when an external operator terminal responds, calling the caller and connecting the caller to this external operator terminal.

31. The system according to claim 24, wherein said terminal management unit calls external operator terminals in the order in which they were registered in the active list and connects a caller to whichever external operator terminal responds first.

32. The system according to claim 24, wherein if an external operator terminal does not respond even when said terminal management unit has called the external operator terminal, which has been registered in the active list, in excess of a set number of times or even when total length of calling time is greater than a set length of time, said terminal management unit automatically deletes this external operator terminals from the active list.

33. The system according to claim 24, further comprising:

additional terminal management units dispersed in areas having time difference relative to one another, and a central management station for centrally managing these terminal management units, if an external operator terminal capable of terminating a call does not exist in the area to which the caller belongs, said central management station having means for obtaining a terminal management unit in an area for which the time difference is smallest relative to the area to which the caller belongs and for instructing this obtained terminal management unit to connect the caller to an external operator terminal by referring to the active list and connecting the caller to this external operator terminal.

34. The system according to claim 24, wherein the terminal management unit is at one of a service control point of an intelligent network and a service switching point of an exchange.

35. The system according to claim 22, further comprising:

means for successively calling external operator terminals by said terminal management unit if the communication apparatus is busy when an incoming call from a caller arrives at the communication apparatus; and if no external operator terminal responds even when length of calling time exceeds a set time or when number of calls made exceeds a set number, for registering a telephone number of the caller in a registration list on the originating side after the caller has discontinued the call.

* * * * *